United States Patent
Chen et al.

(10) Patent No.: US 10,820,253 B2
(45) Date of Patent: Oct. 27, 2020

(54) DISTRIBUTED REACTIVE RESOURCE AND SCHEDULE MANAGEMENT IN TIME SLOTTED CHANNEL HOPPING NETWORKS

(71) Applicant: Convida Wireless, LLC, Wilmington, DE (US)

(72) Inventors: Zhuo Chen, Claymont, DE (US); Chonggang Wang, Princeton, NJ (US); Xu Li, Plainsboro, NJ (US); Quang Ly, North Wales, PA (US); Shamim Akbar Rahman, Cote St. Luc (CA); Vinod Kumar Choyi, Conshohocken, PA (US); Rocco Di Girolamo, Laval (CA); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/739,267

(22) PCT Filed: Jun. 30, 2016

(86) PCT No.: PCT/US2016/040346
§ 371 (c)(1),
(2) Date: Dec. 22, 2017

(87) PCT Pub. No.: WO2017/004353
PCT Pub. Date: Jan. 5, 2017

(65) Prior Publication Data
US 2018/0176853 A1 Jun. 21, 2018

Related U.S. Application Data

(60) Provisional application No. 62/187,981, filed on Jul. 2, 2015.

(51) Int. Cl.
*H04W 40/24* (2009.01)
*H04W 8/00* (2009.01)
(Continued)

(52) U.S. Cl.
CPC ......... *H04W 40/246* (2013.01); *H04W 8/005* (2013.01); *H04W 28/26* (2013.01);
(Continued)

(58) Field of Classification Search
CPC combination set(s) only.
See application file for complete search history.

(56) References Cited

U.S. PATENT DOCUMENTS 7,103,371 B1   9/2006   Liu
8,982,708 B1 * 3/2015   McCabe ............... H04L 45/28
                                                        370/216
(Continued)

FOREIGN PATENT DOCUMENTS

EP   0031606   7/1981
EP   0036939   10/1981
(Continued)

OTHER PUBLICATIONS

Eastham et al., "Synthesis and spectroscopic characterization of all the intermediates in the Pd-catalysed methoxycarbonylation of ethane", Chem. Commun., 2000, 609-610.
(Continued)

*Primary Examiner* — Lonnie V Sweet
(74) *Attorney, Agent, or Firm* — BakerHostetler

(57) ABSTRACT

Wireless channels and timeslots are allocated in a distributed and reactive manner by network devices. A source device sends to neighbor devices a track discovery request indicating a destination and data bandwidth/channel and timeslot requirements. The neighbors conditionally forward the message until it reaches the destination device. The forwarded message includes information about the devices traversed by the message. Messages will not be forwarded if the recipient lacks sufficient resources to accommodate the data bandwidth requirements. The destination selects a path to be a
(Continued)

communications track based upon characteristics of the one or more paths by which the request was received, and sends a reply back to the source device along the selected path. Once established, tracks may be kept alive, updated, and/or repaired via messaging among the devices along the track.

20 Claims, 23 Drawing Sheets

(51) Int. Cl.
    *H04W 28/26*     (2009.01)
    *H04W 40/28*     (2009.01)
    *H04W 4/70*     (2018.01)
    *H04L 12/911*     (2013.01)

(52) U.S. Cl.
    CPC ........... *H04W 40/28* (2013.01); *H04L 47/726* (2013.01); *H04W 4/70* (2018.02)

(56) References Cited

U.S. PATENT DOCUMENTS

| | | | | |
|---|---|---|---|---|
| 2007/0104215 A1* | 5/2007 | Wang | ...................... | H04L 45/02 370/458 |
| 2010/0074273 A1* | 3/2010 | Ji | ........................... | H04L 45/10 370/465 |
| 2014/0219168 A1* | 8/2014 | Joo | ..................... | H04W 40/246 370/328 |
| 2015/0200738 A1* | 7/2015 | Wetterwald | ........... | H04W 16/02 370/442 |
| 2016/0021017 A1* | 1/2016 | Thubert | ................ | H04L 47/125 370/235 |
| 2016/0134539 A1* | 5/2016 | Hui | ........................ | H04L 47/12 709/223 |
| 2016/0269188 A1* | 9/2016 | Thubert | .................. | H04L 45/02 |
| 2016/0278121 A1* | 9/2016 | Agiwal | ................. | H04W 8/005 |
| 2017/0099226 A1* | 4/2017 | Vasseur | ................ | H04L 47/826 |
| 2017/0289846 A1* | 10/2017 | Wetterwald | ....... | H04L 29/08018 |

FOREIGN PATENT DOCUMENTS

WO     2007/125514 A2     11/2007
WO     WO 2015/030580 A1     3/2015

OTHER PUBLICATIONS van Beek et al., "Synthesis of methyl propanoate by Baeyer-Villiger monooxygenasees", Chem. Commun., 2014, 50, 13034-13036.

Xue et al., "Effect of Metal Additives on Structure and properties of a Co/SiO$_2$ Hydrogenation Catalyst", Chinese Journal of Catalysis, 2012, 33, 1642-1649.

Wang, et al., "6TiSCH Operation Sublayer (6top) Interface, draft-ietf-6tisch-6top-interface-00" 6TiSCH Internet-Draft, Mar. 27, 2014, 29 pages.

Vilajosana, et al., Minimal 6TiSCH Configuration, draft-ietf-6tisch-minimal-02, 6TiSCH Internet-Draft, Jul. 4, 2014, 20 pages.

Thubert, et al., "An Architecture for IPv6 Over the TSCH Mode of IEEE 802.15.4e, draft-ietf-6tisch-architectue-01" 6TiSCH Internet-Draft, Feb. 14, 2014, 24 pages.

Shelby, et al., "The Constrained Application Protocol (CoAP)" Internet Engineering Task Force (IETF) RFC: 7252, Jun. 2014, 113 pages.

Perkins et al., "Ad Hoc On-Demand Distance Vector (AODV) Routing" Netwrok Working Group, RFC: 3561, Jul. 2003, 37 pages.

Johnson, et al., "The Dynamic Source Routing Protocol (DSR) for Mobile Ad Hoc Networks for IPv4" Network Working Group, RFC: 4728, Feb. 2007, 107 pages.

IEEE Standards Association, "Part 15.4: Low-Rate Wireless Personal Area Networks (LR-WPANs) Amendment1: MAC Sublayer" IEEE Standard for Local and Metropolitan Area Networks, Apr. 16, 2012, 225 pages.

Dujovne, et al., "6TiSCH On-The-Fly Scheduling, draft-dujovne-6tisch-on-the-fly-03" 6TiSCH Internet-Draft, Jul. 4, 2014, 13 pages.

Conta, et al., "Internet Control Message Protocol (ICMPv6) for the Internet Protocol Version 6 (IPvS) Specification", Network Working Group, RFC: 4443, Mar. 2006, 25 pages.

Chen et al., "Use Cases and Requirements for Using Track in 6TiSCH Networks draft-wang-6tisch-track-use-cases-01" 6Tisch Internet Draft, Jul. 2, 2015, 10 pages.

"Internet Control Message Protocol version 6 (ICMPv6) Parameters" http://www.iana.org/assignments/icmpv6-parameters/icmpv6-parameters.txt, Nov. 16, 2018, 10 pages.

\* cited by examiner

| Application (e.g. CoAP) | Transport (e.g. UDP) | Routing (e.g. RPL) | ICMP | IPv6 | 6LoWPAN | 6TiSCH Operation Sublayer | IEEE 802.15.4e (TSCH) | IEEE 802.15.4 PHY |
|---|---|---|---|---|---|---|---|---|

FIG. 1

DISTRIBUTED REACTIVE RESOURCE AND SCHEDULE MANAGEMENT IN TIME SLOTTED CHANNEL HOPPING NETWORKS

CROSS-REFERENCE

This Application is a National Stage Application filed under 35 U.S.C. § 371 of International Application No. PCT/US2016/040346 filed Jun. 30, 2016, which draws priority from U.S. Provisional Patent Application Ser. 62/187,981 (Chen, et al.) filed Jul. 2, 2015, entitled Distributed Reactive Resource and Schedule Management in Time Slotted Channel Hopping Networks, the disclosure of which is hereby incorporated by reference as if set forth in its entirety.

BACKGROUND

Machine-To-Machine (M2M) and Internet-Of-Things (IoT) network deployments may employ time slotted channel hopping communications between nodes such as M2M/IoT servers, gateways, and devices which host M2M/IoT applications and services. Such network deployments may include, for example, low power and lossy networks (LLNs), time slotted channel hopping (TSCH) networks, constrained networks, wireless sensor networks, wireless mesh networks, mobile ad hoc networks, and/or wireless sensor and actuator networks.

In time slotted channel hopping communications, packets are transmitted at various carrier channel frequencies in various timeslots. Each timeslot and channel combination is a communications resource called a cell. A sequence of cells used along a path from a source device to destination device is called a track. Tracks are often reserved for certain purposes. A matrix of cells indexed by a timeslot and channel offsets is called a TSCH Schedule.

6TiSCH networks are networks using Internet Engineering Task Force (IETF) Internet Protocol version 6 (IP6) over the Time Slotted Channel Hopping (TSCH) mode of the IEEE 802.15.4e. IEEE 802.15.4e was chartered to define a Medium Access Control (MAC) amendment to the existing standard IEEE 802.15.4-2006. IEEE 802.15.4-2006 adopted a channel hopping strategy to improve the reliability for LLNs. LLNs may include, for example, networks contending with narrow-band interference and multi-path fading. In the TSCH mode of IEEE 802.15.4e, time is divided into several timeslots, timeslots are grouped into one or more slotframes, and each slotframe repeats continuously over time.

SUMMARY

Described herein are systems and methods whereby wireless channels and timeslots in a network of channel hopping devices are allocated in a distributed and reactive manner by network devices themselves. A source device sends to neighbor devices a track discovery request indicating a destination and data bandwidth/channel and timeslot requirements. The neighbors conditionally forward the message until it reaches the destination device. The forwarded message includes information about the devices traversed by the message. Messages will not be forwarded if the recipient lacks sufficient resources to accommodate the data bandwidth requirements.

If the destination device possesses the necessary resources to support the requested track, the destination device selects a path from among the one or more paths by which the request was received. The selection may be based upon characteristics of the paths, e.g., first path, shortest path, least interference, etc. The destination device sends a reply back to the source device along the selected path, confirming that the selected path has become a track for future communications between the source and destination.

Once established, tracks may be kept alive, updated, and/or repaired via messaging among the devices along the track. For instance, the source device may request to increase, decrease, or release the resources reserved for the track. Devices may also detect and/or report communications errors, and initiate corrective new track discovery requests accordingly.

The methods may be implemented in a variety of environments, including, but not limited to IETF IPv6 over the TSCH mode of IEEE 802.15.4e (6TiSCH), and IETF Constrained Application Protocol (CoAP), Internet Control Message Protocol (ICMP), IETF Routing Over Low power and Lossy networks (ROLL) networks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed.

FIG. 1 is a network layer hierarchy.

DETAILED DESCRIPTION OF ILLUSTRATIVE EMBODIMENTS

6TiSCH is a proposed protocol for implementing Internet Engineering Task Force (IETF) Internet Protocol version 6 (IP6) of the Time Slotted Channel Hopping (TSCH) mode of time mode of the IEEE 802.15.4e. IEEE 802.15.4e was chartered to define a Medium Access Control (MAC) amendment to the existing standard IEEE 802.15.4-2006. IEEE 802.15.4-2006 adopted a channel hopping strategy to improve the reliability for Low-power and Lossy Networks (LLNs). LLNs include, for example, networks contending with narrow-band interference and multi-path fading. In the TSCH mode of IEEE 802.15.4e, time is divided into several timeslots, timeslots are grouped into one or more slotframes, and each slotframe repeats continuously over time.

A 6TiSCH network primarily consists of constrained devices that use TSCH mode of 802.15.4e as the Medium Access Control (MAC) protocol. The IETF 6TiSCH Working Group is addressing protocols for addressing network layer issues of 6TiSCH networks. For example, to manage the TSCH schedule, a 6TiSCH Operation Sublayer (6top) is proposed in the 6TiSCH Working Group. 6top is a sublayer which is the next-higher layer for IEEE 802.15.4e TSCH MAC as shown in FIG. 1. 6top offers both management and data interfaces to an upper layer. For example, 6top offers commands such as READ/CREATE/UPDATE/DELETE to modify its resource, e.g. a TSCH Schedule, such as the schedule shown in Table 1 below.

Figure 2:
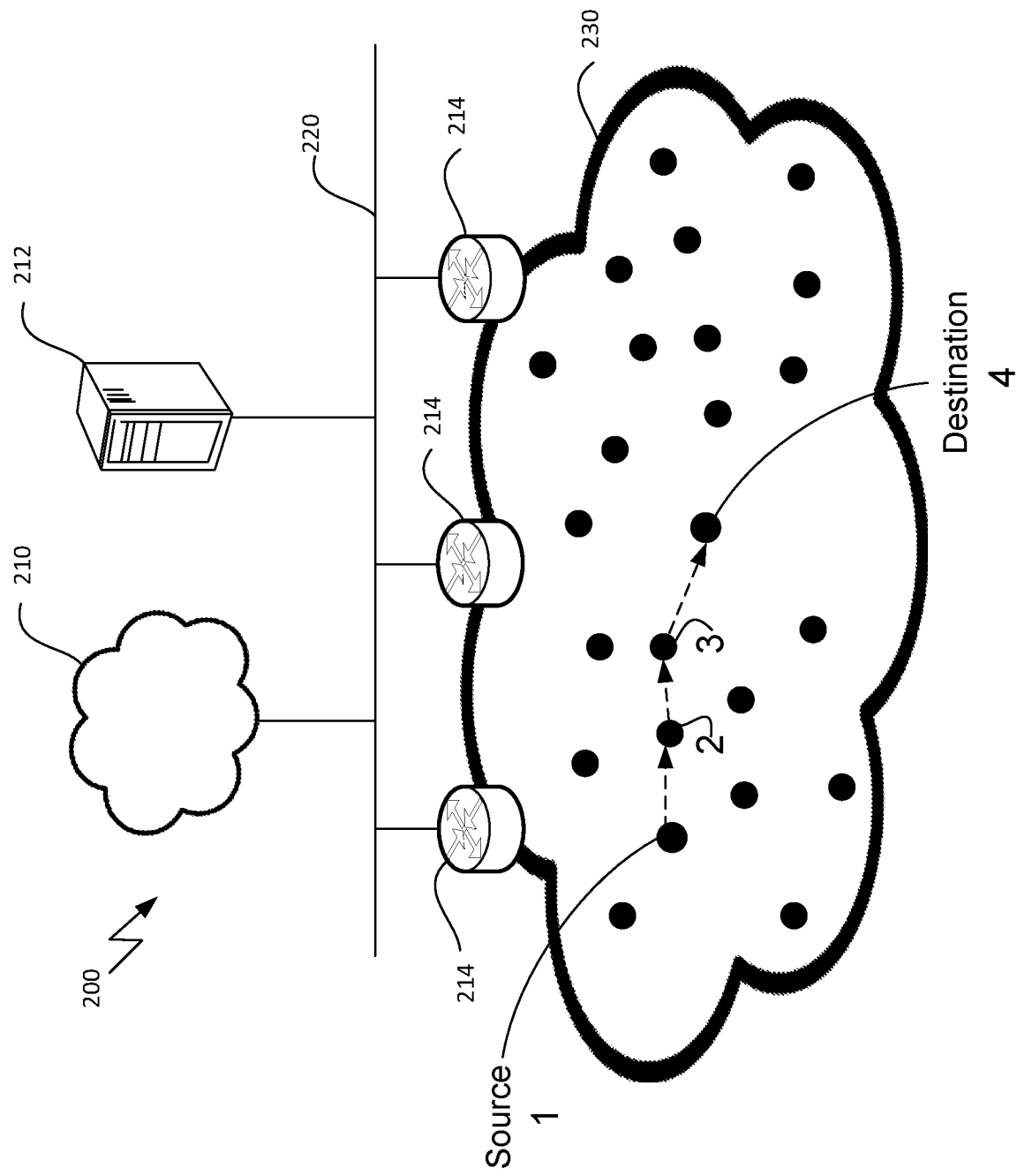
FIG. 2 is a schematic view of a reference architecture of a 6TiSCH network.

FIG. 2 shows a reference architecture 200 including a 6TiSCH network 230. Three types of devices are shown: Low power and Lossy Network (LLN) devices, e.g., devices 1-4, backbone routers (BRs) 214, and a central controller 212. BRs 214 normally are powerful devices that are located at the border of a 6TiSCH network. The BRs 214 act as gateways to connect the 6TiSCH network to other networks 220 and/or the Internet 210.

LLN devices 1-4 normally have constrained resources, e.g., limited power supply, memory, and/or processing capability. They connect to one or more BRs 214 via single hop or multi-hop communications. Due to their limited resources, LLN devices 1-4 may not be able to support complicated protocols such as Transmission Control Protocol (TCP). However, LLN devices 1-4 typically can support network layer protocols such as Internet Control Message Protocol (ICMP) protocol.

The 6TiSCH network 230 may be managed by the central controller 212. The central controller 212 has the capability of calculating not only the routing path between a source and a destination but also configuring the TSCH schedule for each of LLN devices in a centralized way. The central controller can be co-located on a backbone router (BR) 214 or outside of the 6TiSCH network.

Table 1 shows an example of an LLN device's TSCH schedule. Table 1 is a matrix of cells, where each cell corresponds to a channel during a timeslot. The x-axis is the timeslot offset, and the y-axis is the channel offset. Communication resources in 6TiSCH networks may be managed using such schedules. Each LLN device may use one or more cells to communicate via channel hopping.

In general, any given cell in such a table could be a scheduled cell or an unscheduled cell. Here, the LLN device is scheduled to transmit or receive a packet during timeslot 0 using channel 0. This type of cell is shared by all LLN devices in the network. The shared slots can be used for broadcast transmission. Typically, there are few shared slots in a given slotframe.

According to the schedule, the LLN device turns on its radio to receive an incoming packet from a transmitter at timeslot 1 over channel 1. If a packet is received, the LLN device sends back an ACK (acknowledgement) in the same slot. Also according to the schedule, the LLN device may transmit a packet to a receiver at timeslot 2 using channel 15. During timeslot 99, all the channels are unscheduled, so the LLN device may simply turn off its radio during timeslot 99.

TABLE 1

An Example of an LLN device's TSCH Schedule of a SlotFrame

| Offset | Timeslot | | | | |
|---|---|---|---|---|---|
| Channel Offset | 0 | 1 | 2 | ... | 99 |
| 0 | TxRxShare | | | | Unscheduled |
| 1 | | Rx | | | Unscheduled |
| ... | | | | | Unscheduled |
| 15 | | | Tx | | Unscheduled |

A scheduled cell is called a "hard cell" if it is configured by a central controller. This means that the cell cannot be further configured or modified by the LLN device itself. Herein "LLN device" will refer to a device that is not a central controller or a backbone router.

A scheduled cell is called a "soft cell" if it was configured by an LLN device. Such cells can be further configured by either an LLN device or by a central controller. However, once a soft cell is configured by the centralized controller, it will become a hard cell accordingly.

Due to the TSCH nature of a 6TiSCH network, MAC-layer resources comprising timeslot and channel combinations, i.e., schedule cells, need to be allocated for LLN devices to communicate with each other. For adjacent devices, direct "single hop" communication may be achieved by scheduling resources "on-the-fly" utilizing unscheduled slots, for instance.

Communication may occur indirectly via multiple hops. In FIG. 2, for example, LLN device 1 communicates with LLN device 4 via multiple hops. To achieve this, a track, i.e., a sequence of cells, may be scheduled. There are a number of possible 6TiSCH track reservation schemes.

Table 2 shows an example of a track in the form of a set of schedules for a set of LLN devices 1-4. By this means, a track can be reserved to enhance the multi-hop communications between the source and the destination. Through its table, each LLN device on the track knows what cells it should use to send and receive packets from its previous hop. For example, LLN device 2 knows that the LLN device 1 will transmit a packet in slot 1 using channel 0. Each LLN device also knows what cells it should use to send packets to its next hop. For example, LLN device 2 knows it shall transmit a packet to LLN device 3 using slot 2 and channel 15. By using the track, the throughput and delay of the path between the source and the destination can be guaranteed, which is extremely important for industrial automation and process control.

Centralized, hybrid, and distributed track reservation schemes are possible. In a centralized scheme, each LLN device in the network pro-actively reports its TSCH schedule and topology information to the central controller of the network. To reserve a track, the source LLN device sends a request to the central controller, and the central controller calculates both the route and schedule, and sets up hard cells in the TSCH schedule of LLN devices.

In a hybrid scheme, each LLN device in the network pro-actively reports its topology information to its backbone router, and the backbone routers communicate with each other to obtain the global topology information of the network. To reserve a track, the source LLN device sends a request to its backbone router, and the backbone router replies with candidate routes from source to the destination. LLN devices on the route then negotiate and setup soft cells in their TSCH schedules to communicate with each other. Distributed schemes will be discussed further below.

Internet Control Message Protocol version 6 (ICMPv6), specified in IETF RFC 4443, is used by hosts and routers to communicate network-layer information to each other. ICMP is often considered as part of the Internet protocol (IP.) ICMP messages are carried inside IP datagrams. The ICMP message format is shown in Table 3. Each ICMP message contains two fields that define its purpose, Type and Code, and a Checksum. The Type field identifies the ICMP message. The Code field provides further information about the associated Type field. The Checksum provides a method for determining the integrity of the message. Any field labeled "unused" is reserved for later extensions and must be zero when sent, but receivers should not use these fields, except to include them in the checksum. According to the Internet Assigned Numbers Authority (IANA), the type numbers of 159-199 are unassigned. 6TiSCH commands may be carried ICMPv6 messages.

TABLE 2

An Example of a track from an LLN device 1 to LLN device 4 in FIG. 2.

| Offset | Timeslot | | | |
|---|---|---|---|---|
| Channel Offset | 0 | 1 | 2 ... | 99 |
| (a) TSCH Schedule of LLN device 1 | | | | |
| 0 | Track 1 Tx to LLN device 2 | | | |
| 1 | | | | |
| ... | | | | |
| 15 | | | | |
| (b) TSCH Schedule of LLN device 2 | | | | |
| 0 | Track 1 Rx from LLN device 1 | | | |
| 1 | | | | |
| ... | | | | |
| 15 | | | Track 1 Tx to LLN device 3 | |
| (c) TSCH Schedule of LLN device 3 | | | | |
| 0 | | | | |
| 1 | | | | |
| ... | | | | |
| 15 | | | Track 1 Rx from LLN device 2 | Track 1 Tx to LLN device 4 |
| (d) TSCH Schedule of LLN device 4 | | | | |
| 0 | | | | |
| 1 | | | | |
| ... | | | | |
| 15 | | | | Track 1 Rx from LLN device 3 |

TABLE 3

| ICMPv6 Control Message Format Bit offset | | | |
|---|---|---|---|
| 0-7 | 8-15 | 16-31 | 32- |
| Type | Code | Checksum | Message |

An 802.15.4 information element (IE) is a defined yet flexible and extensible mechanism to exchange data at the MAC sublayer. There are two IE types: Header IEs and Payload IEs. Header IEs are used by the MAC to process the frame. Header IEs cover security, addressing, etc., and are part of the MAC header (MHR.) Payload IEs are destined for another layer or SAP and are part of the MAC payload. An example of an IE in a data frame format is shown in Table 4.

TABLE 4

| Data Frame Format | | | | | | |
|---|---|---|---|---|---|---|
| Octets: 2 | 0/1 | variable | 0/1/5/6/10/14 | variable | variable | 2 |
| Frame Control | Sequence Number | Addressing Fields | Auxiliary Security Header | Information Elements | Data Payload | FCS |
| | | | | Header IEs | Payload IEs | |
| | | MHR | | MAC Payload | | MFR |

Figure 3:
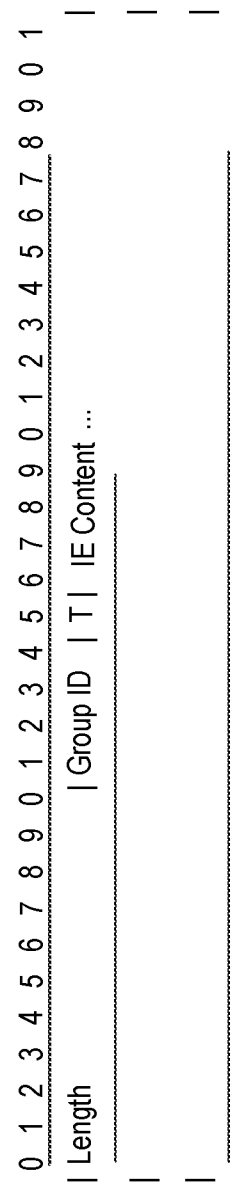
FIG. 3 is a data layout of an IEEE 802.15.4 information element (IE).

The general format of a payload IE consists of an identification (ID) field, a length field, and a content field as shown in FIG. 3 and described in Table 5.

TABLE 5

Payload IE General Format

| Fields name | Description |
| --- | --- |
| Length | The length of the IE |
| Group ID | The Group ID can be set as an unreserved value between 0x2-0x9, e.g. 0x2. |
| T | Set to 1 to indicate this is a long format packet |
| IE Content | The content of the IE. |

Figure 4:
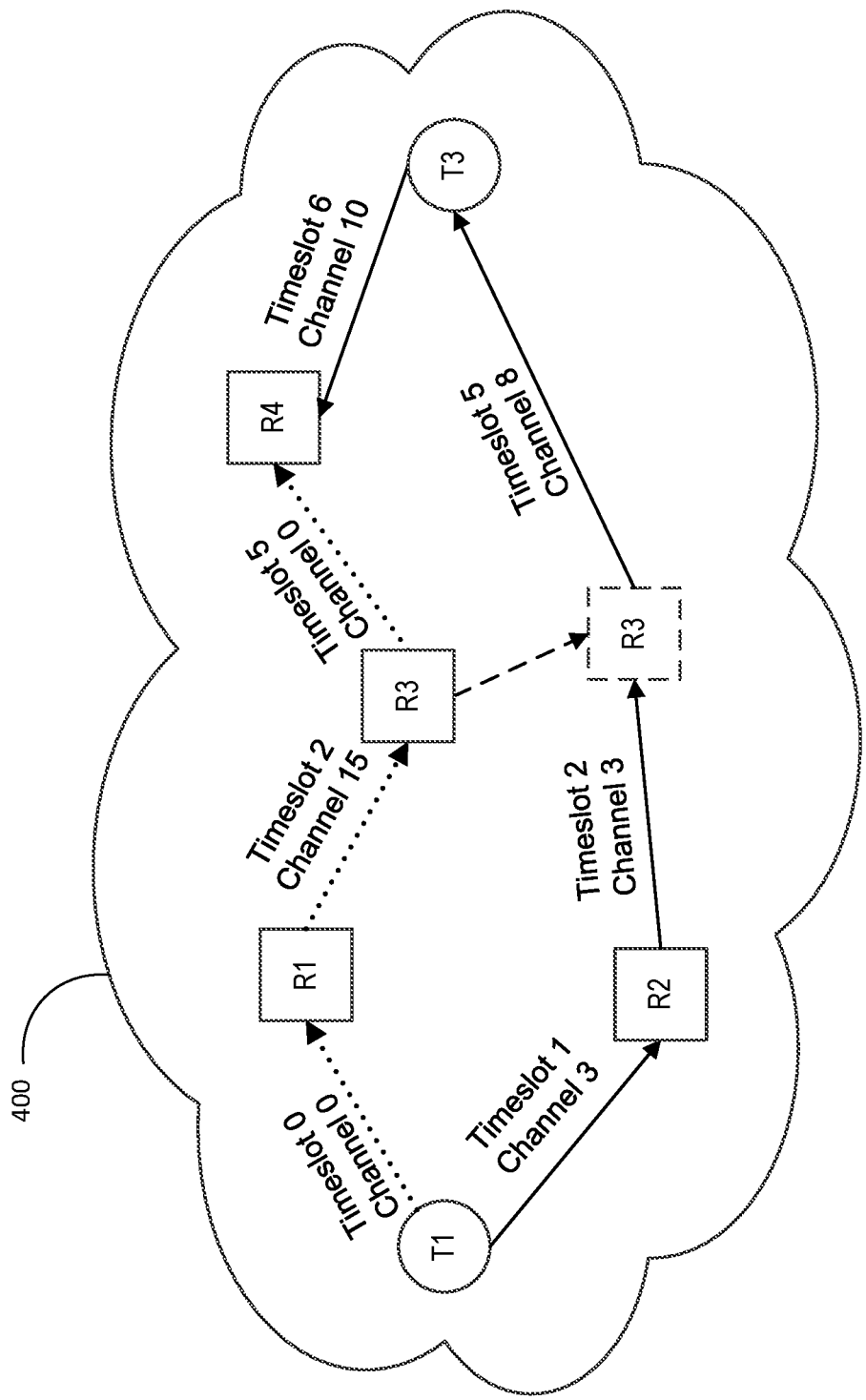
FIG. 4 is a schematic view of an example 6TiSCH network scenario.

FIG. 4 shows a use case of a 6TiSCH network 400 for industrial automation and process control. In this use case, temperature sensors T1 and T3 and robots R1, R2, R3, and R4 are LLN devices in an automation assemble line. Periodically, sensor T1 sends signaling packets to robot R4. If, for example, sensor T1 is located at the first step of an automated assembly line, and sends its signaling packets whenever it finishes a task to trigger the next step in the method, then any unexpected delay or loss of these packets may impact smooth and efficient performance of the assembly line. Packet loss, for example, may result in product defects. Reserving a track between T1 and R4, e.g., the series of connections shown with dotted lines in FIG. 4, may not only guarantee a fixed delay of these signaling packets, but also improve the reliability of these packet by reducing interference.

In a factory network such as the one depicted in FIG. 4, some LLN devices, e.g. the robots, may be mobile. Therefore, a reserved track may be broken due to a mobile LLN device moving out of range. For example, the track shown in dotted lines may become inoperative due to R3 moving out of the transmission range of R1 or receiving range of R4. In such a case, it would be highly advantageous for a new track, such as the one shown in solid lines, to be quickly setup to replace the broken track and deliver time sensitive packets from T1 to R4.

Centralized track reservation schemes may not be available in all cases. Even when they are available, the schemes have limitations when the size of the network grows. In centralized resource and schedule management schemes, all LLN devices report their topologies information, e.g. their neighbors, to the central controller of the network, and then the central controller calculates the optimal track from source to the destination. Afterwards, the central controller notifies LLN devices on the track to reserve resources.

Centralized schemes have several limitations. First, high traffic load around the central controller may occur when the size of the network grows. Typically in a centralized scheme, all LLN devices periodically report their TSCH schedules, and these may each include a large amount of information, e.g., at least 500 bytes. Moreover, since the TSCH schedule of an LLN device changes dynamically, the LLN device has to send extra update messages to the central controller when its TSCH schedule changes. Therefore, the traffic load around central controller is high and a track discovery request may not be delivered to the central controller promptly.

Second, a centralized scheme may lack robustness. If the central controller is down, devices in the network cannot reserve new tracks. Although it is possible to have a backup central controller, the deployment cost will be increased and extra overhead may be introduced when switching between different central controllers.

Similarly, pro-active track reservation schemes generally may not perform well when the topology of the network changes frequently, e.g., due to the mobility of LLN devices. In pro-active track reservation schemes, LLN devices in the network periodically send topology information, e.g. its neighbors, to a backbone router or the central controller. An LLN device will not detect a topology change multiple hops away until it receives a message that contains topology information from its neighbors. Therefore, LLN devices may not catch the topology changes if they send topology information infrequently. However, sending topology information more frequently will consume a lot of energy, which is not suitable for battery power constrained LLN devices.

Schemes have been proposed whereby path discovery and the resource reservation are achieved via separate procedures. For example, paths may be discovered using IETF RFC 4728 Dynamic Source Routing Protocol (DSR) for Mobile Ad Hoc Networks for IPv4 or IETF RFC 3561 Ad hoc On-Demand Distance Vector (AODV) Routing. Then a central controller, backbone router, and or LLN devices may start negotiating the reservation of resources along the path. Such schemes may be redundant or wasteful in a number of ways. For example, a separate path discovery may not reveal that devices along the path lack sufficient resources needed for the track. Hence negotiations could be initiated in vain and fail before an adequate path is discovered and its resources are reserved.

An alternative to central or proactive scheduling is a distributed resource reservation method whereby a source LLN device discovers a desirable path and reserves resource along it, forming a track, to the destination LLN device. The method includes a low overhead track discovery method for the source LLN device to reactively discover a well-performed path, e.g., the shortest path, such that all the LLN devices on the path have the necessary TSCH resources to connect messages to the destination. The method also includes a low overhead track selection method to reserve all resources along the track.

This distributed method may include low overhead methods for LLN devices in the network to manage the track from the source to the destination. For example, the source LLN device may keep the track alive by sending track keep-alive messages to the destination. Similarly, the source LLN device may update the track by increasing, decreasing, or releasing the resources reserved for the track. Similarly, LLN devices on the track may detect and handle the errors on the track in a distributed, dynamic fashion.

The distributed method may be implemented, for example, within 6TiSCH networks using IETF Internet Control Message Protocol (ICMP) protocol, IEEE 802.15.4e Information Elements, and/or IETF Constrained Application Protocol (CoAP).

Figure 5:
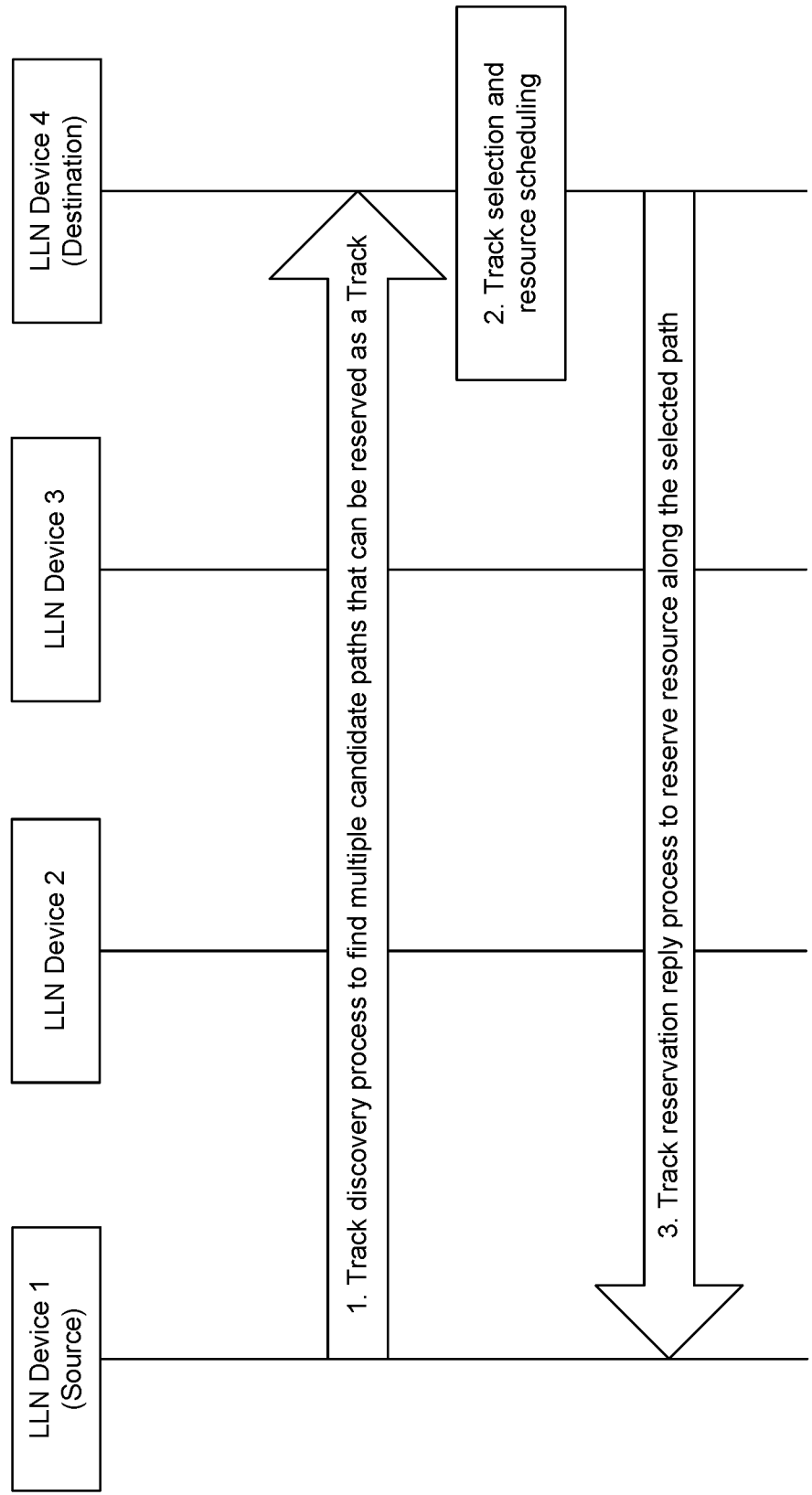
FIG. 5 is a call flow of an example track discovery and reservation method.

FIG. 5 depicts an example a proposed general distributed reactive track reservation method 500. Source LLN device 1 wishes to send information to destination LLN device 4, but at first there is no track reserved for this communication. Therefore, in step 1, LLN device 1 initiates a track discovery and reservation method to discover candidate paths that have enough resources to satisfy the requirements of the communication between the source and the destination. This is a reactive method since the LLN devices in the network are not required to pro-actively report topology information to other LLN devices in the network.

In step 2, the destination LLN device 4 selects a path as the track from among the paths discovered in step 1. In step 2, LLN device 4 may also calculate the resources along the track. In step 3, the destination LLN device 4 initiates a track reservation method. The overall method 500 is fully distributed, since no centralized controller is required to be involved in the method.

Figure 6:
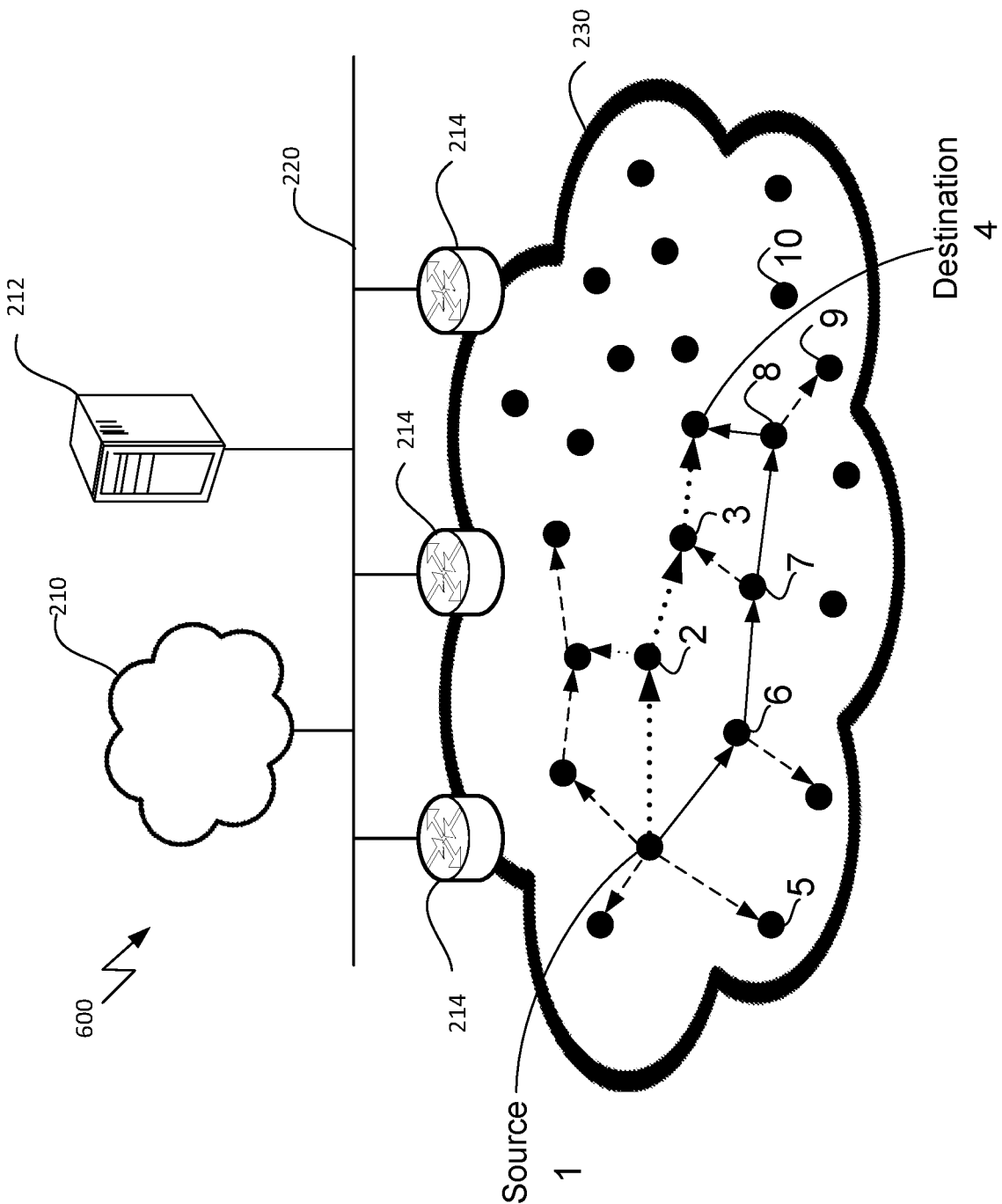
FIG. 6 is a schematic view of an example 6TiSCH network scenario.

FIG. 6 illustrates example paths of packets among the LLN devices in a system 600. The devices are similar to those discussed in reference to FIG. 2. Here LLN devices 1-8 are involved in following the method 500 described with reference to FIG. 5. In FIG. 6, the backbone routers 214, central controller 220, and network 230 connecting them to the Internet 210 are not used. Source device 1 sends a track discovery request message to its neighbors, including devices 2, 5, and 6, to discover one or more candidate tracks to the destination LLN device 4. Each LLN device that receives the track discovery request message checks whether that device is the target recipient and, if not, forwards it, if appropriate. Device 5 has nowhere to forward the message. Device 2 forwards the discovery request to device 3, after appending certain resource information. Similarly, device 6 forwards it to 7, device 7 forwards it to devices 3 and 8, and devices 3 and 8 ultimately forwards it to device 4. Hence, the discovery request device will be selectively forwarded by nodes in the network until the message reaches the destination. The discovery request message may include an instruction that it should be forwarded no more than, e.g., four times. Hence, while device 8 forwards the request to device 9, device 9 does not forward it to device 10. The track discovery request message may include, but is not limited, to the fields in Table 6.

Figure 7:
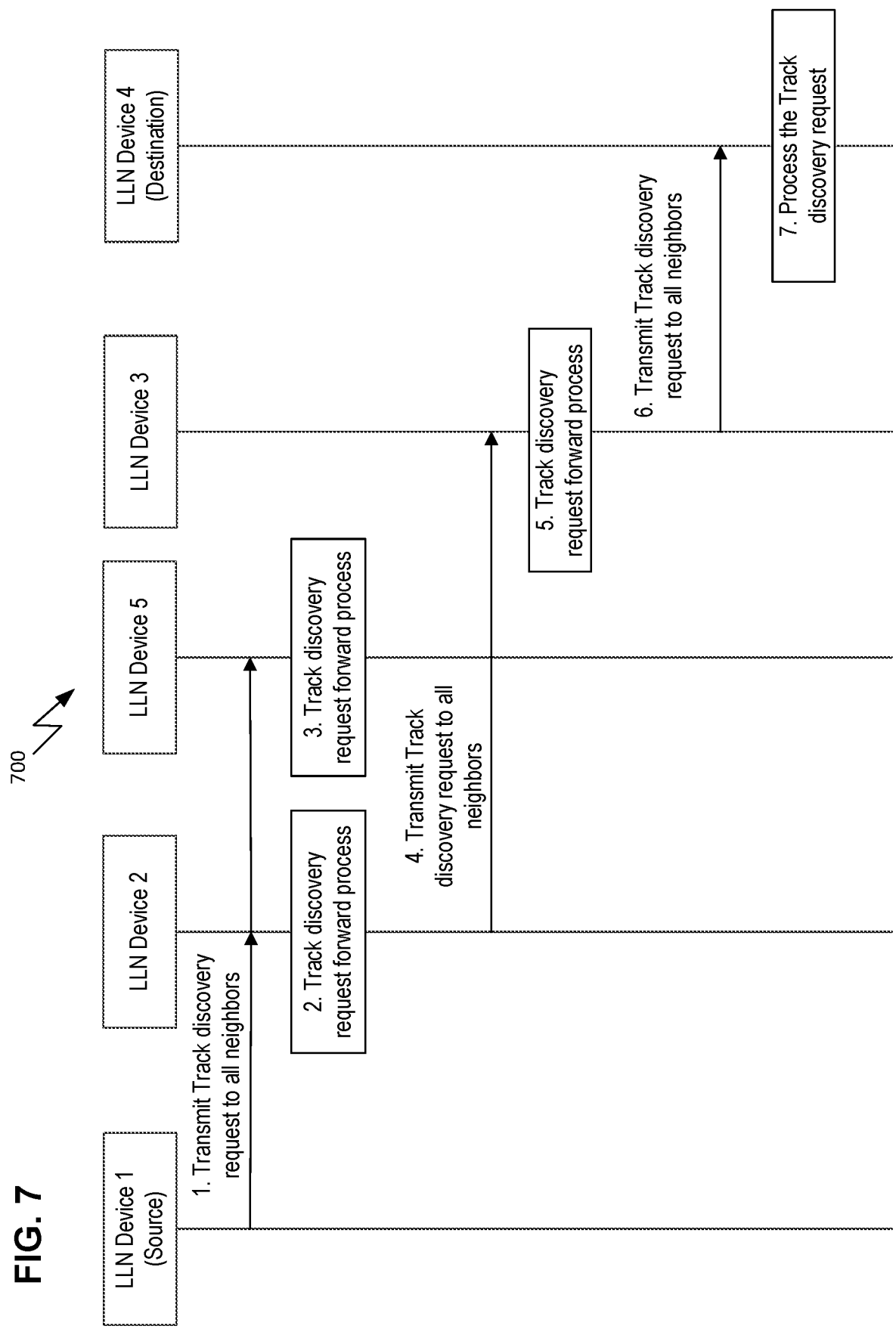
FIG. 7 is a call flow of an example track discovery method.

FIG. 7 shows an example call flow 700 for the track discovery method initiated by LLN device 1 to discovery tracks to LLN device 4. In step 1, the source LLN device 1 may broadcast a track discovery request to all its neighbors using its radio. The source LLN device 1 may also unicast the track discovery request to neighbors using pre-reserved hard or soft cells. For example, if LLN device 1 finds there is an unused hard or soft cell reserved for communications between LLN device 2 and itself, it may send a unicast track discovery request using the cell.

In step 2, when LLN device 2 receives the track discovery request from LLN device 1, device 2 first checks whether the destination address is the same as its own address. For example, if device 2 were the destination, then it would proceed to process the request, as destination device 4 ultimately does in step 7. In the example of FIG. 7, however, device 2 is not the destination. Instead, device 2 checks whether to forward the track discovery request based on criteria that will be discussed below in relation to FIG. 9 and Table 7.

In step 3, when LLN device 5 receives the track discovery request from LLN device 1, it will first check if the destination address is the same as its own address. Since the addresses are different, it will follow the method discussed below in relation to FIG. 9 and Table 7. In this case, it decides not to forward the request based on the forwarding criteria.

In step 4, LLN device 2 inserts its address in a list of the addresses of LLN devices traversed in the track discovery request, along with its available resource, and then forward the modified track discovery request, according to its decision in step 2. Device 2 may broadcast the message to all its neighbors. Since there are limited broadcast time slots in a slotframe, the source LLN device may alternately unicast the track discovery request to neighbors using reserved hard or soft cells. For example, if LLN device 2 finds there is an

TABLE 6

Track Discovery Request Message

| Fields name | Description |
| --- | --- |
| Source Address | The IP/MAC address of the source LLN device that generates the track discovery request. |
| Destination Address | The IP/MAC address of the destination LLN device. |
| Sequence Number | The sequence Number generated by the source LLN device to differentiate the track Discovery Request message it sends. For example, the sequence number is increased by one for each newly generated track discovery request. |
| Length of the "Forward timer" | The time, for example in seconds or number of hops, for an LLN device to set/reset the "Forward Timer" if it decides to forward the request. The value of the field is determined by the source LLN device that generates the track discovery request. |
| Length of the "Track timer" | The time, for example in seconds, for an LLN device to delete/release the resource reserved to a track if it does not receive any packets from that track during that period. |
| Number of soft cells requested | The bandwidth of the track requested in term of number of soft cells. The more cells reserved for the track, the higher throughput supported. |
| Maximum forward times | The maximum number of times the track discovery request can be forwarded. This value is decreased by one each time the track discovery request is forwarded by an intermediate node between the source and destination. A track discovery request which contains zero in the field for the maximum forward times will not be forwarded. The number of times a message is forwarded reflects the latency of the track. |
| Addresses of LLN devices traversed | The IP/MAC address of each LLN device the track discovery request has traversed. Each LLN device will append its IP/MAC address in this field if it forwards the track discovery request. |
| Available resource of LLN devices traversed (optional) | The available resource, in terms of the number of schedule cells available, of each LLN device the track discovery request has traversed. Each LLN device will append its available resource, e.g. number of available slots or index of available slots, in this field when it forwards the track discovery request. | unused hard or soft cell reserved for communications with LLN device 3, it will send a unicast track discovery request using the cell.

In step 5, when LLN device 3 receives the track discovery request from LLN device 2, it will first check if the destination address is the same as its own address. Since the addresses are different, it will follow the method discussed below in relation to FIG. 9 and Table 7. In this case, it decides to forward the request.

In step 6, the LLN device 3 inserts its address in the list of addresses of LLN devices traversed by the track discovery request, along with its available resource. Then LLN device 3 broadcasts the track discovery request to all its neighbors, or, alternatively, since there are limited broadcast time slots in a slot frame, the device 3 may unicast the track discovery request to neighbors using reserved hard or soft cells. For example, if LLN device 3 finds there is an unused hard or soft cell reserved for communications with LLN device 4, it will send a unicast track discovery request using the cell.

In step 7, when LLN device 4 receives the track discovery request from LLN device 3, it will first check if the destination address is the same as its own address. Since the addresses are the same, LLN device 4 will extract the path that the track discovery request has traversed and store in the track candidate set and record the available resource of LLN devices on the candidate track. The destination LLN device 4 may start the track selection reply method to reserve a track based on several criteria. In one example, the destination LLN device 4 may start the track selection reply method after a fixed time period when it receives the first track discovery request from the source LLN device 1 for a period of time. In another example, the destination LLN device 4 may start the track selection reply method after it receives a certain number of track discovery requests from the source LLN device 1. LLN device 4 may also select the size of its track candidate set based on its resource. For a more constrained device, it may only have a small track candidate set. In an extreme resource constrained case, a destination LLN device may start the track selection method after it receives the first track discovery request, and discard all track discovery requests that arrive later. For a less constrained device, the destination LLN device may have a bigger track candidate set. The track selection reply method is described in further detail below with reference to FIG. 11.

Figure 8:
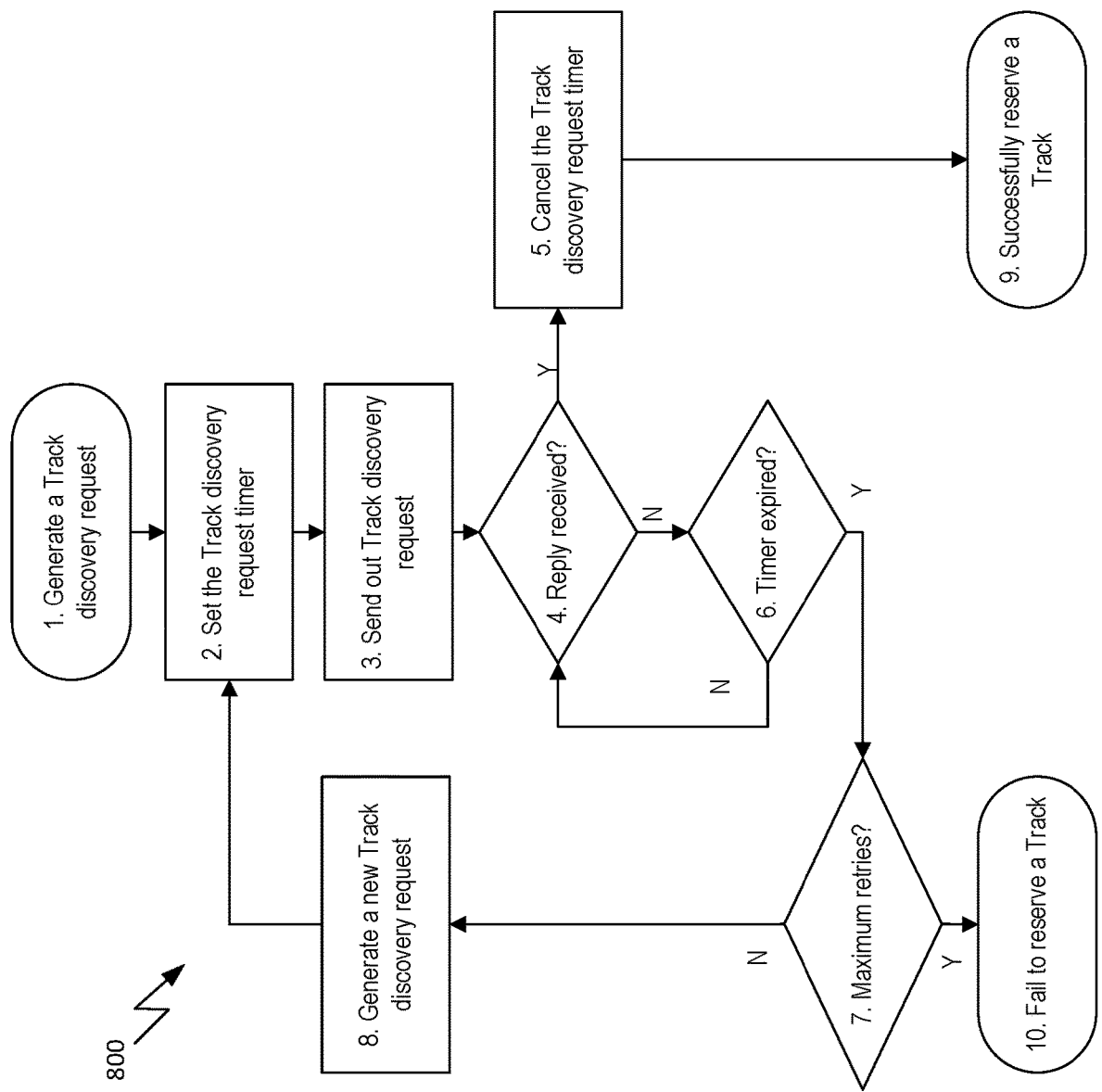
FIG. 8 is a flow chart of an example track discovery request generating method.

FIG. 8 shows an example method 800 by which a source LLN device may discover a track to a destination LLN device.

In step 1, the source LLN device generates a track discovery request and populates it with the information in Table 6. This includes a sequence number, which may be a random integer that is smaller than a constant number, Seq_max, for example, 65535. For each subsequently generated track discovery request, the sequence number will be increased by 1 until it reaches Seq_max. The sequence number field will be set to 1 for a newly generated track discovery request if the sequence number of the previous track discovery request is equal to the Seq_max.

Also in step 1, the source LLN device may also set a maximum number of times the discovery request message is to be forwarded, and a maximum number of attempts that will be made to discover a track. The source LLN device may also indicate the required bandwidth for the track in terms of number of cells required.

In step 2, the source LLN device sets a track discovery request timer for the track discovery request. The value of the timer can be equal or larger than the time expected for the maximum number of forwarding of the message.

In step 3, the source LLN device transmits the track discovery request to all its neighbors using its radio. The LLN device may broadcast the message or unicast it.

In step 4, the source LLN device checks for a reply.

In step 5, if and when the source LLN device receives a reply from the destination LLN device, the source LLN device cancels the track discovery request timer and proceeds to step 9 to record the track selected by the destination LLN device.

In step 6, the source LLN device will increment and monitor the track discovery request timer. If the timer has not expired, the source LLN device will return to step 4. If the time has expired, it will proceed to step 7.

In step 7, the source LLN device checks whether it has reached the maximum retransmission limit for track discovery requests for this particular destination. If so, it fails to reserve a track and goes to step 10. Otherwise, it goes to step 8.

In step 8, the source LLN device will generate a new track discovery request to be sent to the destination. The value of the forward timer for the newly generated track discovery request may be equal or larger than the previous track discovery request to the same destination. For example, the value of the timer may be increased by a constant amount or doubled until it reaches a maximum threshold.

In step 9, the source LLN device successfully reserves a track to the destination LLN device by noting the track selected by the destination LLN device, as indicated in the reply method.

In step 10, the source LLN device fails to reserve a track to the destination LLN device, may release the resource reserved for the track.

For each track discovery forwarded with different source and destination addresses, a LLN device will keep an entry in a track discovery forward table, like the one shown in Table 7, until it receives a track selection reply message from the destination. A forward timer is associated with each entry to indicate how long the LLN device should keep the entry in the track discovery request forward table. After the timer expires, the entry will be deleted and resource reserved will be released.

TABLE 7

Track Discovery Request Forward Table

| Fields name | Description |
| --- | --- |
| Source Address | The IP/MAC address of the source LLN device that generates the track discovery request. The value is copied from the track discovery request message received. |
| Destination Address | The IP/MAC address of the destination LLN device. The value is copied from the track discovery request message received. |
| Sequence number | The sequence Number of the track discovery request that has been forwarded to differentiate track discovery requests that are |

TABLE 7-continued

Track Discovery Request Forward Table

| Fields name | Description |
| --- | --- |
| | originated from and destined to the same LLN devices. The value is copied from the track discovery request message received. |
| Number of slots reserved | The number of slots reserved in order to reserve the track. The value is copied from the track discovery request message received. |
| Track Forward Timer | The time, for example in seconds, for an LLN device to delete/release the resource reserved to a track if it does not receive any packets from that track during that period. The value is copied from the track discovery request message received. |

Figure 9:
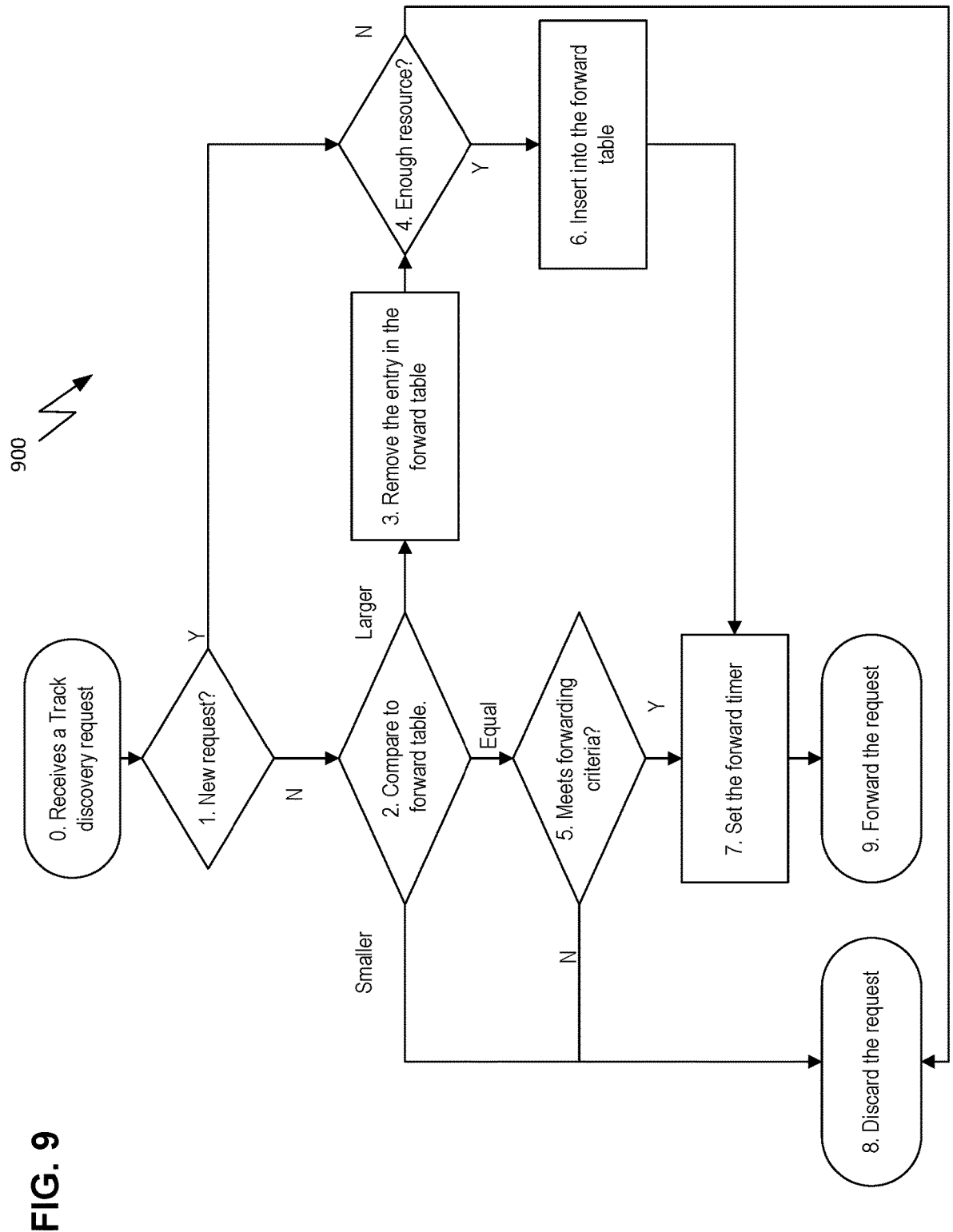
FIG. 9 is a flow chart of an example track discovery request forwarding method.

When an LLN device receives a track discovery request, it may follow a method such as shown in FIG. 9 to process the packet and decide whether to forward the packet as follows.

In step 1, the LLN device checks whether the track discovery request is a new request, e.g., from a different source or to a different destination, by checking the track discovery request forward table. See, e.g., Table 7. If so, it goes to step 4. Otherwise, the LLN device has forwarded a track discovery request from and to the same LLN devices. If the forward timer of the track discovery request has not expired yet, it will go to step 2.

In step 2, the LLN device compares the sequence number of the track discovery message received with the sequence number of the entry with the same source and destination. If the sequence number of the track discovery message received is smaller, it indicates this is an old track discovery request that should be discarded by step 8. If the sequence number of the track discovery message received is larger, it indicates this is a new track discovery message that should be processed as a new request, and the entry in the forward table should be removed in step 3. Otherwise, it goes to step 5 to decide whether to forward the request received.

In step 3, the LLN device will remove the entry in the track discovery request forward table, release the resources reserved for the track, and terminate the forward timer associated with the entry. The method then goes to step 4.

In step 4, the LLN device will check whether the number of non-reserved slots it has is equal or larger than the number of slots requested in the track discovery request message. If so, the method goes to step 6. The method goes to step 8 to discard the request.

In step 5, the LLN device will check the forward criteria to decide whether to forward the track discovery request. The forward criteria could include or be a combination of the following.

The forward criteria could include hop count, whereby LLN devices only forward the first request it receives originated from the same source LLN device with the same sequence number. In order to employ this scheme, each LLN device needs to maintain a track discovery request history table that keeps the track discovery requests it has received. An example entry of the track discovery request table is shown in Table 8.

TABLE 8

Track Discovery Request History Table Entry for Forwarding by Hop Count

| Source Address | The IP/MAC address of the source LLN device that generates the track discovery request. |

TABLE 8-continued

Track Discovery Request History Table Entry for Forwarding by Hop Count

| Sequence Number | The sequence Number generated by the source LLN device to differentiate the track Discovery Request message it sends. |
| --- | --- |
| Minimum Hop Count | The minimum number of hops that track discovery requests have traversed with the same source address and sequence number. |

The forward criteria could include hop count, whereby the LLN device only forwards a request that comes from a path which is strictly shorter than the paths of all other requests originated from the same source LLN device with the same sequence number. In order to employ this scheme, each LLN device needs to maintain a track discovery request history table that keeps the track discovery requests it has received, e.g., as shown in Table 8.

The forward criteria could include hop count, whereby the LLN device only forwards a request that comes from a path which is not longer than the paths of all other requests originated from the same source LLN device with the same sequence number. In order to employ this scheme, each LLN device needs to maintain a track discovery request history table that keeps the track discovery requests it has received, e.g., as shown in Table 8.

The forward criteria could include a maximum number of times the message may be forwarded, whereby the LLN device will not forward a packet of which the maximum forward times in the track discovery request is zero.

The forward criteria could include a check of available resources, whereby the LLN devices only forwards the request if their non-reserved slots is equal or larger than the number of slots requested in the track discovery request.

If the LLN device decides to forward the track discovery request, it will go to step 7. Otherwise, it will go to step 8 to discard the request.

In step 6, the LLN device will create a new entry in track discovery request forward table. The source and destination addresses and sequence number are copied from the request. The LLN device will decrease its non-reserved slots by the number of slots requested in the track discovery request.

In step 7, the LLN device sets the value of the forward timer associated with the entry in the track discovery request forward table to the same value indicated in the track discovery request, then goes to step 9. If the timer expires, the LLN device removes the entry from the forward table and releases the resource reserved, thus the number of non-reserved slots will be increase by the number of resource released.

In step 8, the LLN device will not forward and, instead, discards the track discovery request.

In step 9, the LLN device inserts its address into the list of addresses of LLN devices traversed and inserts its available resource such as number of non-reserved slots in the list of available resources of LLN devices traversed in the track discovery request, and then forwards the track discovery request.

In the track reservation method, the destination LLN device first decides the track or tracks it intends to reserve from the track candidate set. There are several ways to choose the track from the track candidate set. For example, the destination LLN device may choose the shortest track in terms of hop counts.

Figure 10:
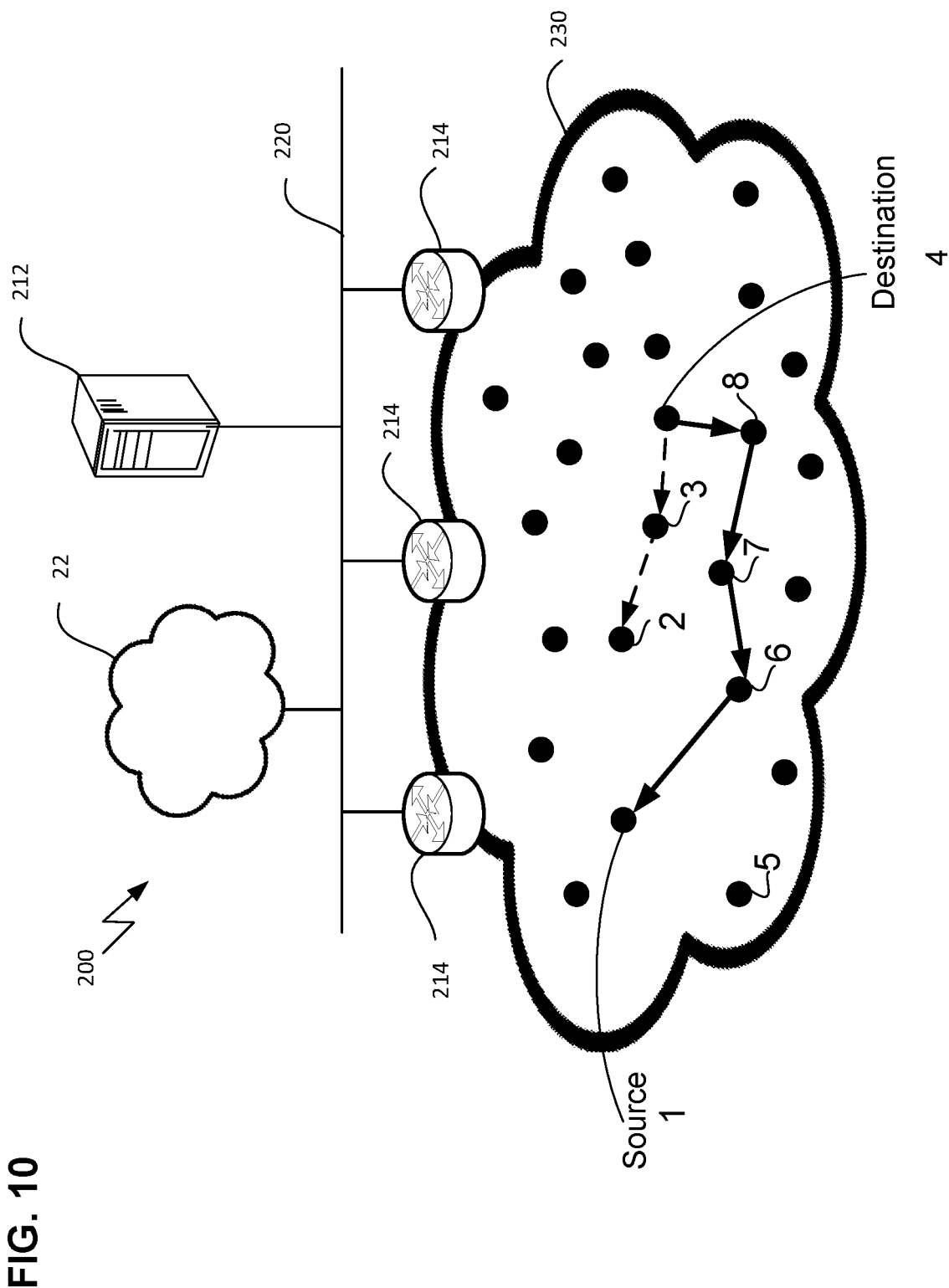
FIG. 10 is a schematic view of an example 6TiSCH network scenario.

To reserve a selected track, the destination LLN device generates a track selection reply message and unicasts it to the source LLN device along the selected track, in the reverse order of the path that the track discovery request comes from. In the example of FIG. 10, destination LLN device 4 sends the track selection reply message back to source LLN device 1 along the selected track shown with solid arrows, from 4 to 8, then 8 to 7, 7 to 6, and finally from device 6 to device 1. The track selection reply message may include, but is not limited to, the fields in the example of Table 9.

TABLE 9 track Selection Reply Message

| Fields name | Description |
| --- | --- |
| Source Address | The IP/MAC address of the LLN device that generates this track selection reply message, i.e. the destination LLN device. |
| Destination Address | The IP/MAC address of the LLN device that receives this track selection reply message, i.e. The source LLN device. |
| Sequence Number | The sequence number of the track Discovery Request message that the track selection reply message responses. |
| Number of soft cells requested | The number of soft cells that should be reserved for the track |
| Addresses of LLN devices will traverse | The IP/MAC address of each LLN device the track selection reply message is going to traverse. Each LLN device will delete its IP/MAC address in this field when it forwards the track selection reply. |

Figure 11:
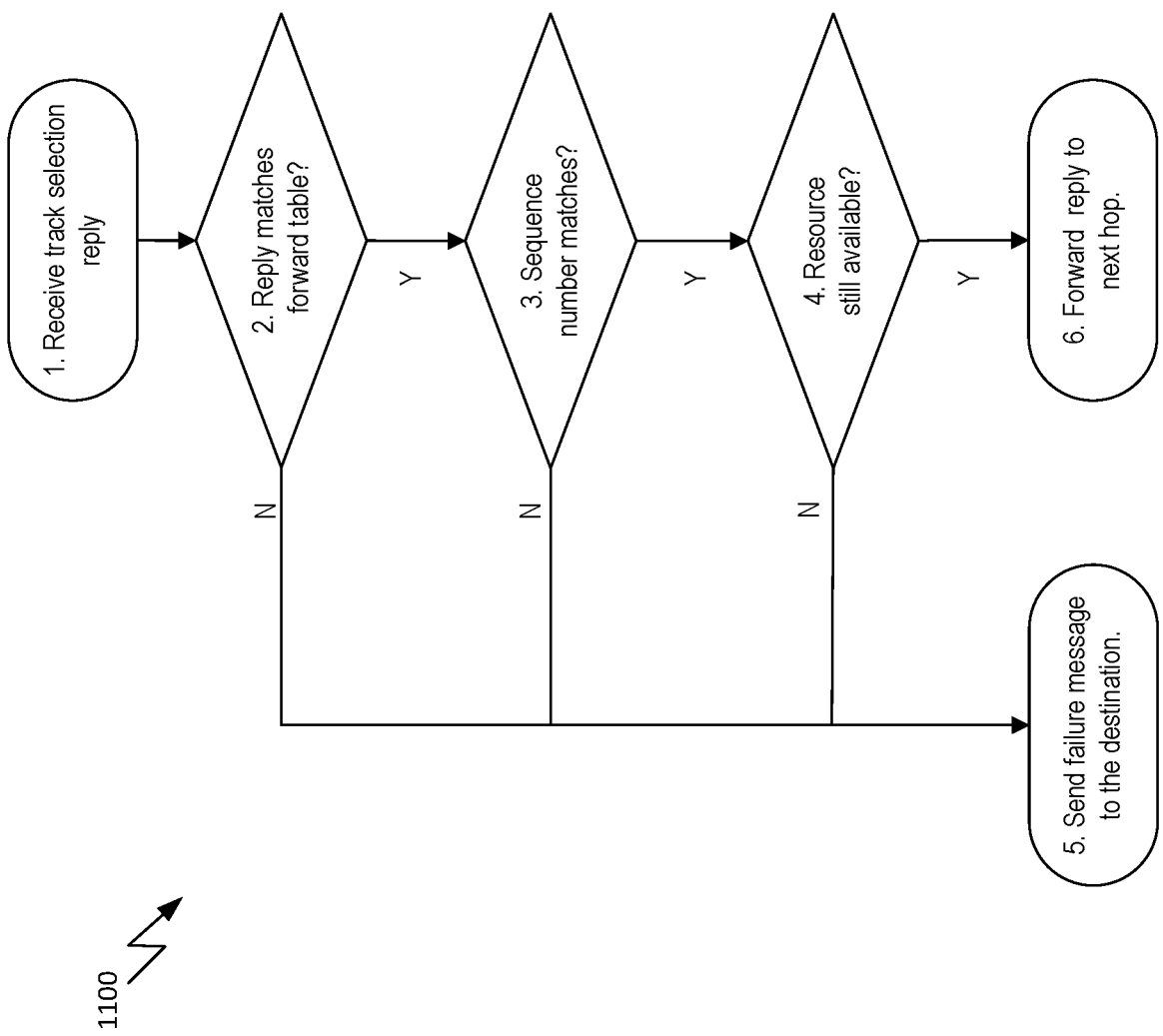
FIG. 11 is a flow chart of an example track selection and reservation method.

When an LLN device receives a track selection reply message, it may follow a method such as the method depicted in FIG. 11.

In step 1, the LLN device receives a track selection reply message originated from the destination LLN device. The LLN device extracts the source address, destination address and sequence number in the message.

In step 2, the LLN device searches its forward table to determine whether if it has forwarded a track discovery request whose source and destination addresses are the same as the destination and source addresses respectively. If so, it goes to step 3. Otherwise it goes to step 5.

In step 3, the LLN device compares the sequence number in the track selection reply message with the sequence number of the matched entry. If they are the same, it goes to step 4. Otherwise it goes to step 5 otherwise.

In step 4, the LLN device checks whether the reserved resource for the track is still available. If so it goes to step 6. Otherwise it goes to step 5.

In step 5, the LLN device fails to reserve the track and sends a track selection failure message to the destination forward by LLN devices transmits the track selection reply message.

In step 6, the LLN device will stop the forwarding timer associated with the entry in the forward table, remove the address of the LLN device from the list of addresses of LLN devices will traverse in the track selection reply message, and then forward the track selection reply message to the next hop LLN device in the messages. The LLN device allocates the resource for the track and sets the track timer to the value of the entry in the forward table.

Figure 12:
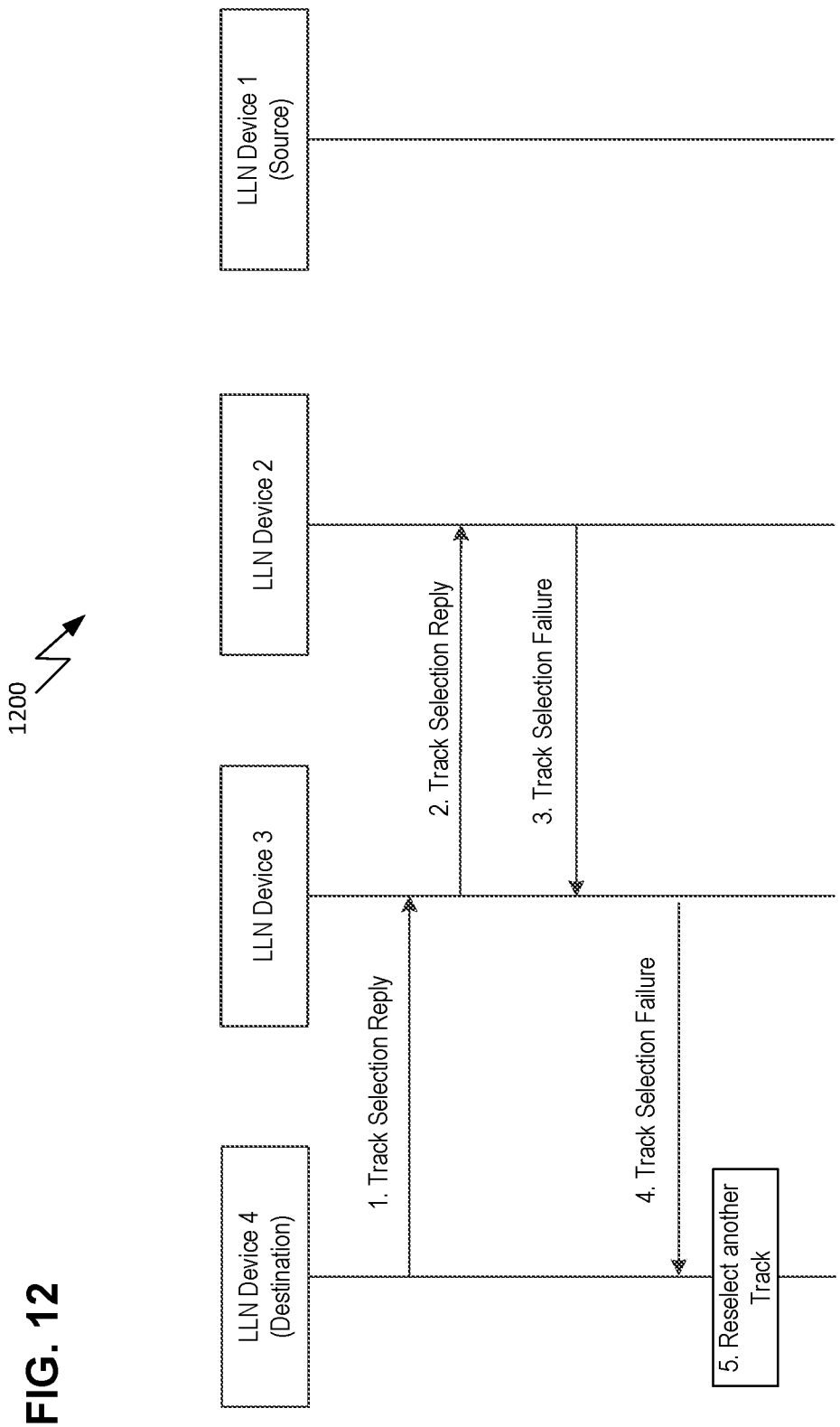
FIG. 12 is a call flow of an example track selection failure scenario.

FIG. 12 shows an example call flow 1200 where a track selection reply message fails to reserve a track. In this example, LLN device 1 is the source of a track discovery request, LLN device 4 is the destination, and LLN devices 2 and 3 are intermediary devices along the track. Call flow 1200 begins when LLN device 4 selects a track and sends a track selection reply message 1 to LLN device 3. LLN device 3 then processes and forwards the track selection reply as message 2 to LLN device 2. Normally, when an LLN device, receives a track selection reply message, it will allocate to the track the schedule cells that it had reserved when it received the associated track discovery request, e.g., soft cells that it had set aside for the purpose of the selected track. However, one or more of these resources may have been allocated as hard cells by the central controller sometime after LLN device 2 forwarded the track discovery request to LLN device 3 and before it received the track selection reply from LLN device 3. In that case, LLN device 2 may not have enough resources available to reserve the track, and as shown in FIG. 12, LLN device 2 may generate a track reservation failure message 3. The track reservation failure message may include, but is not limited to, the fields in Table 10. The track reservation failure message will be forwarded back to the destination LLN device. Here LLN device 3 processes message 3 and forwards it to LLN device 4 as message 4. In response, the destination LLN device will select another track that does not include the failed link, and then send out a new track selection reply message. For example, LLN may choose a new track via LLN devices 8, 7, and 6, should in solid lines in FIG. 10.

TABLE 10

Track Reservation Failure Message

| Fields name | Description |
| --- | --- |
| Source Address | The IP/MAC address of the LLN device that initiates the track reservation, i.e. the source LLN device. |
| Destination Address | The IP/MAC address of the LLN device that receives this track reservation failure message, i.e. the destination LLN device. |
| Failure Link information | The addresses of two LLN devices that are on the ends of the link, which does not have enough resource. |

Figure 13:
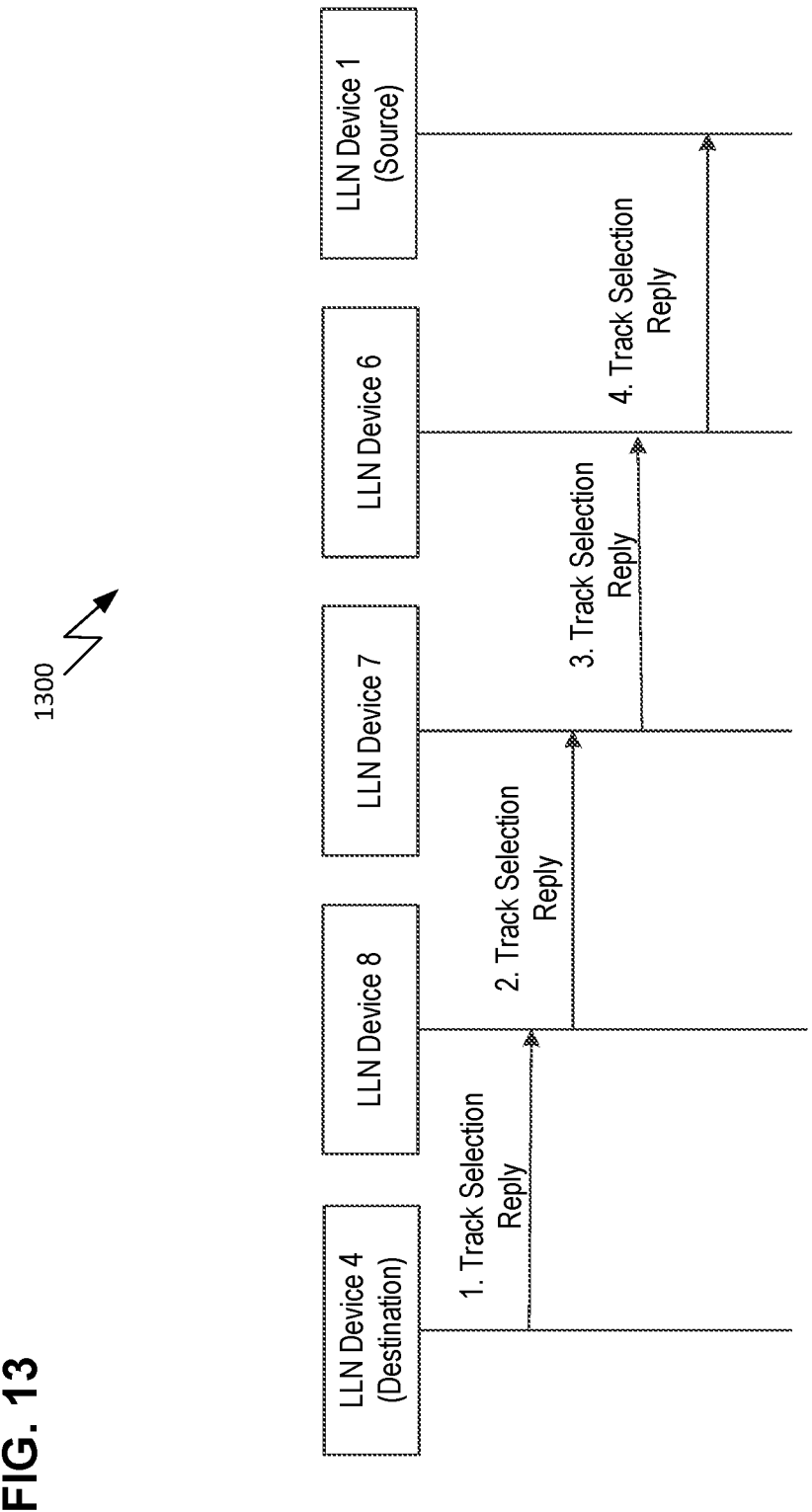
FIG. 13 is a call flow of an example track selection success scenario.

FIG. 13 shows an example call flow 1300 where the track selection reply message reserves a track successfully. In this example, LLN device 4 selects the track and sends a track selection reply message 1. Each of the intermediary LLN devices 8, 7, and 6, and 4 on the track is able to allocate soft cells requested, stop its forward timer associated with the entry in the forward table, remove its address from the list of addresses of LLN devices traversed on the track in the track selection reply message, and then forward the track selection reply message to the next LLN device on the list. LLN 8 receives message 1 from LLN 4, processes and sends message 2 to LLN device 7. LLN 7 receives message 2, processes it, and sends message 3 to LLN device 6. LLN 6 receives message 3, processes it, and sends message 4 to LLN device 1. After LLN device 1 finishes reserving the resource, the track discovery and reservation method is completed.

After a track has been reserved between the source LLN device and the destination LLN device, LLN devices on the track may need to manage the track. This may include, for example, using track keep-alive messaging, track updates, and track error detection and handling.

Figure 14:
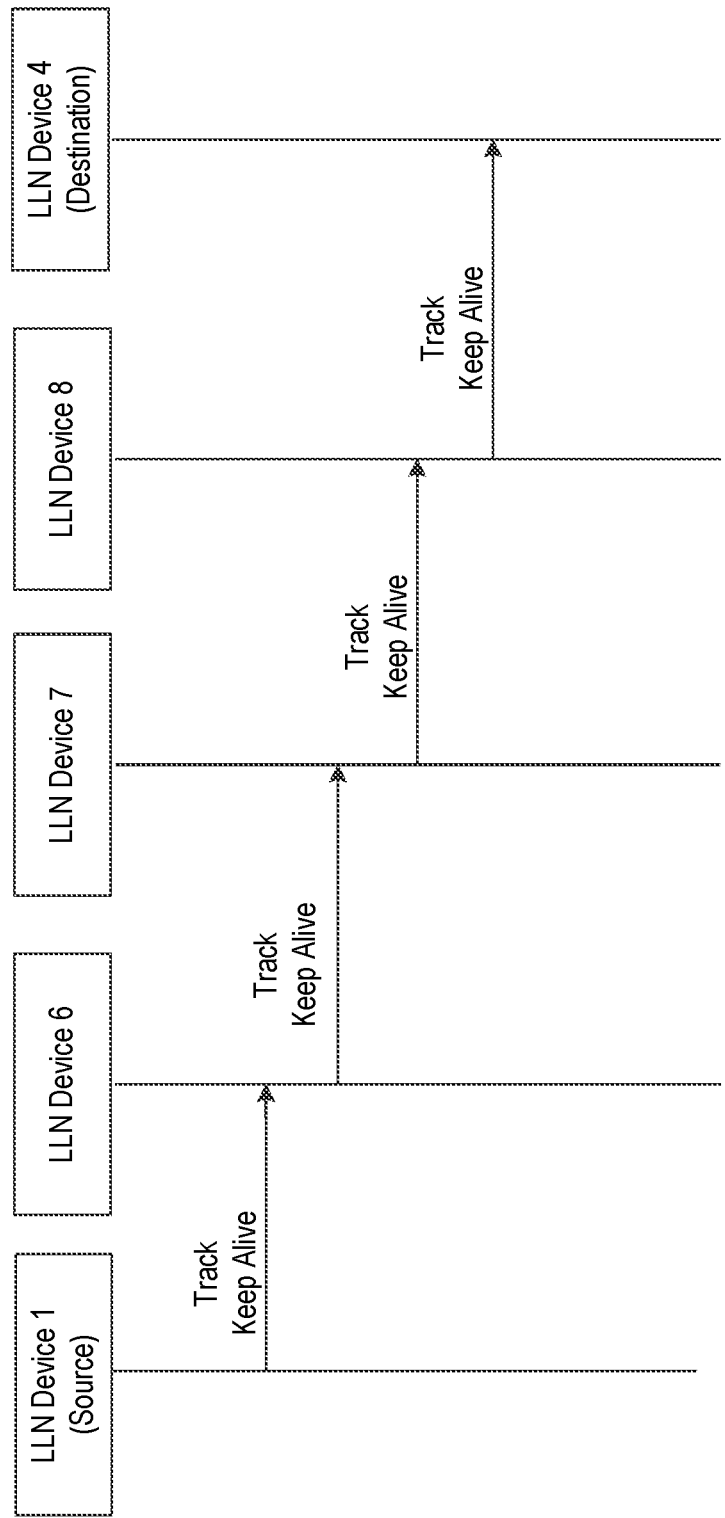
FIG. 14 is a call flow of an example track maintenance keep-alive method.

FIG. 14 show an example call flow 1400 by which keep-alive messaging may be used to preserve the reservation of track resources even when the track is inactive. Otherwise, devices may be configured to reclaim soft cell resources allocated to idle tracks. In the example of FIG. 14, each of the LLN devices 1, 6, 7, 8, and 4 may set a track timer to the initial value whenever it has a packet to pass along the track. If an LLN device does not have a packet to send, but still intends to keep the resource on the track reserved, it sends out a keep-alive message at least one slot frame length before the track timer expires. The track keep-alive message will be forwarded by LLN devices on the track as shown in FIG. 14. The track keep-alive message may include, but is not limited to, the fields in Table 11.

TABLE 11

Track Keep-alive Message

| Fields name | Description |
| --- | --- |
| Source Address | The IP/MAC address of the LLN device that initiates the track alive message, i.e. the source LLN device. |
| Destination Address | The IP/MAC address of the LLN device that receives this track keep-alive message, i.e. the destination LLN device. |

Figure 15:
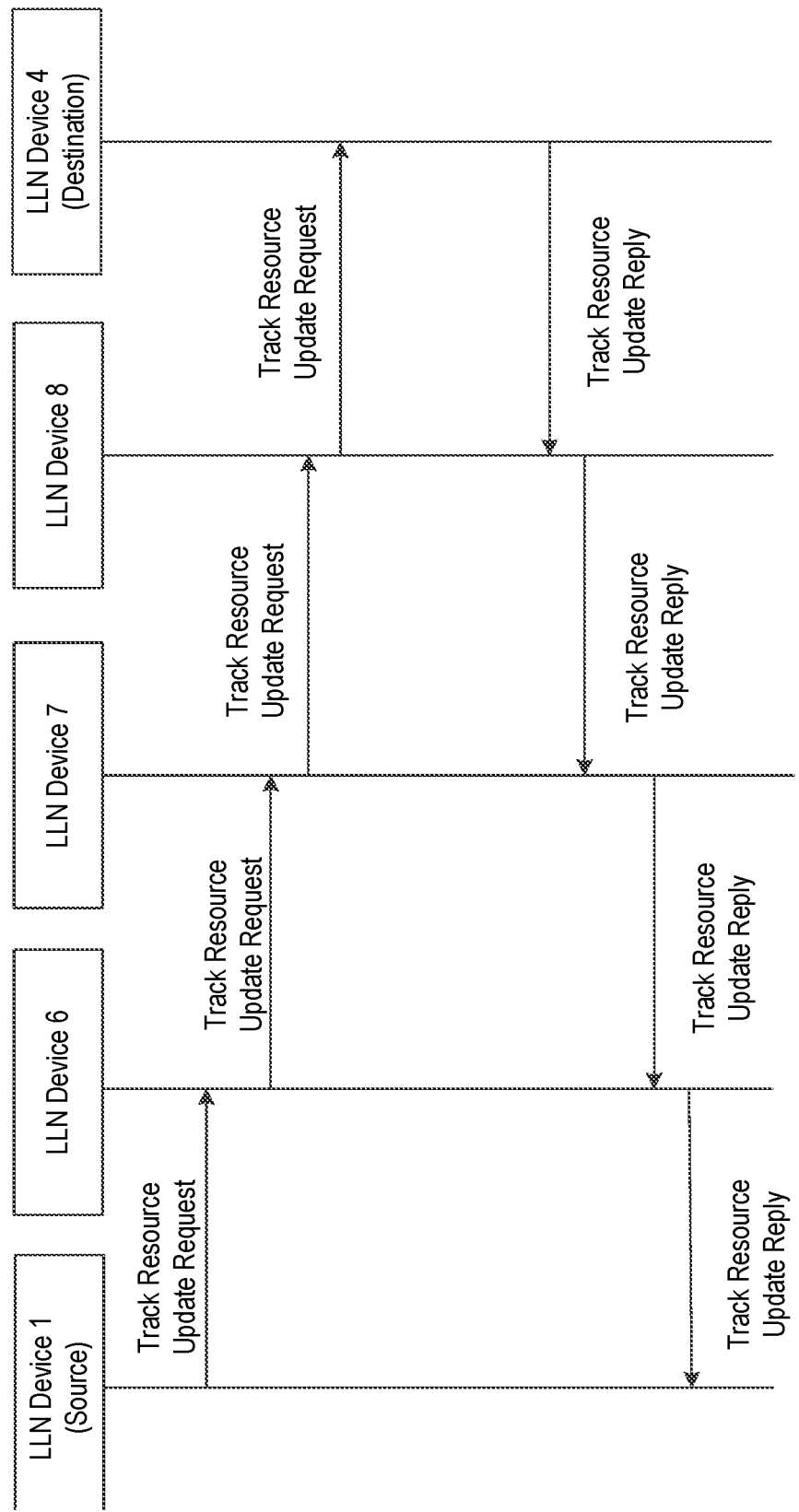
FIG. 15 is a call flow of an example track update method.

FIG. 15 shows an example call flow 1500 by which a source LLN device may increase or decrease the resources reserved for the track by sending a track resource update request message to the destination LLN device. The track resource update request message may include but is not limited to fields in Table 12. When an LLN device on the track receives a track update request message, it will forward the track update request message to the next LLN device on the track provided that it has been able to accommodate and reserve the updated resource requirements contained in the request. Here in FIG. 15, intermediary LLN device 6, 7, and 8, and destination LLN device 4 are able to accommodate the request. Upon success of the update at the destination LLN device 4, that device initiates a track resource update reply, which is passed back to the source LLN device 1. The track resource update reply message may include, but is not limited to, the fields in Table 13. If the destination LLN device has the requested resource reserved, it may set the "result of update" field as true. The other LLN devices 8, 7, and 6 may undertake similar operations as the track update reply message is passed back to source LLN device 1.

Figure 16:
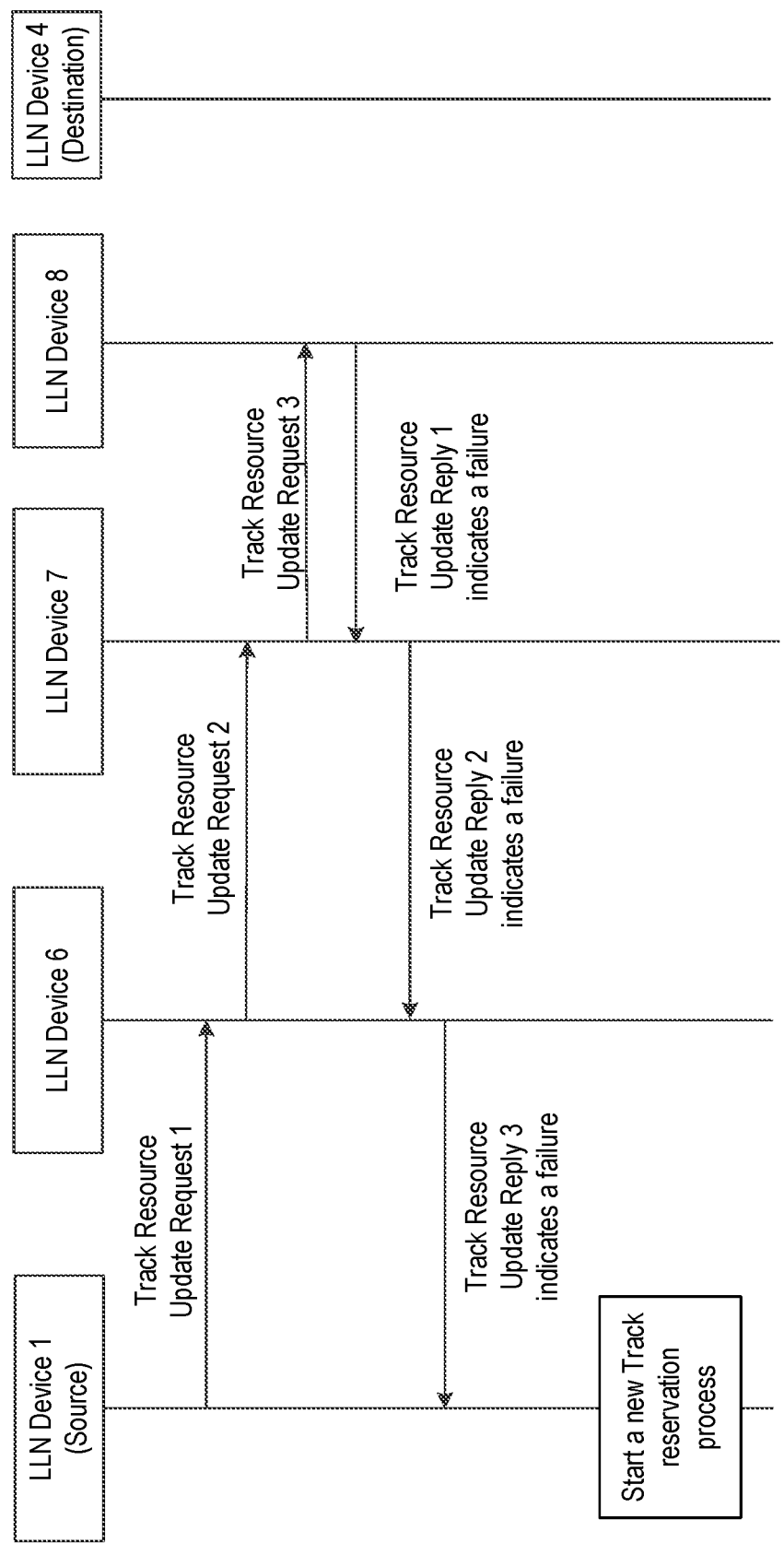
FIG. 16 is a call flow of an example track update failure scenario.

FIG. 16 shows an example call flow 1600 in which an update to a track requested by a source LLN device cannot be accommodated. As in FIG. 15, here in FIG. 16, source LLN 1 device sends a track resource update request 1, which is processed and forwarded by LLN devices 6 and 7 in track resource update requests 2 and 3 respectively. However, LLN device 8 is unable to accommodate the resource request. The request fails. LLN device does not forward the request on to destination LLN device 4, but instead sends a track resource update reply message 1 to LLN device 7. In the reply message 1, LLN device 4 indicates that the request has failed by, for example, setting the "result of update" field to false. The reply is forwarded by LLN devices 7 and 6 back to source LLN device 1. Reply messages 1, 2, and 3 include an indication that the update request has failed. In response to notification of the failure, source LLN device 1 may initiate a new track reservation method.

When a track resource update request indicates that the source LLN device intends to release all reserved resources on the track, it may be preferred that intermediary LLN devices keep at least one slot reserved for the track until the device receives a confirming track resource update reply message.

TABLE 12

Track Resource Update Request Message

| Fields name | Description |
| --- | --- |
| Source Address | The IP/MAC address of the LLN device that initiates the track reservation, i.e. the source LLN device. |
| Destination Address | The IP/MAC address of the LLN device that receives this track reservation failure message, i.e. the destination LLN device. |
| Resource Reserved | The resource, in number of slots, will be reserved for the track. |

TABLE 13

Track Resource Update Reply Message

| Fields name | Description |
| --- | --- |
| Source Address | The IP/MAC address of the LLN device that initiates the message. |
| Destination Address | The IP/MAC address of the LLN device that receives this message, i.e. the source LLN device. |
| Results of the updates | The value is true if all LLN devices on the track successfully reserve the resources requested. The value is false if one of LLN devices on the track fails to reserve the resources requested. |

A track error may occur when an LLN device on the track does not have required resources to hold the track. For example, some soft cells of the track may be reallocated to hard cells of other tracks by the central controller. Alternatively, a link between two LLN devices on the track is broken due to one of the devices moving out of communications range. Errors may be detected in several ways. For example, an error is known when: an LLN device transmits a packet to its next hop LLN device on the track, and does not receive an ACK before it reaches a maximum retry limit; an LLN device does not receive any packet from a previous hop LLN device on the track until the track timer associated with the track expires; and/or an LLN device receives a track error notification message, e.g., of the form shown in Table 14, from another LLN device.

TABLE 14

Track Error Notification Message

| Fields name | Description |
| --- | --- |
| Source Address | The IP/MAC address of the LLN device that initiates the track error notification message, i.e. the LLN device that detects the link error. |
| Destination Address | The IP/MAC address of the LLN device that receives this track error notification message, i.e. the LLN device on the previous hop on the track. |
| Broken Link information | The addresses of two LLN devices that are on the ends of the link, which is broken. |

Figure 17:
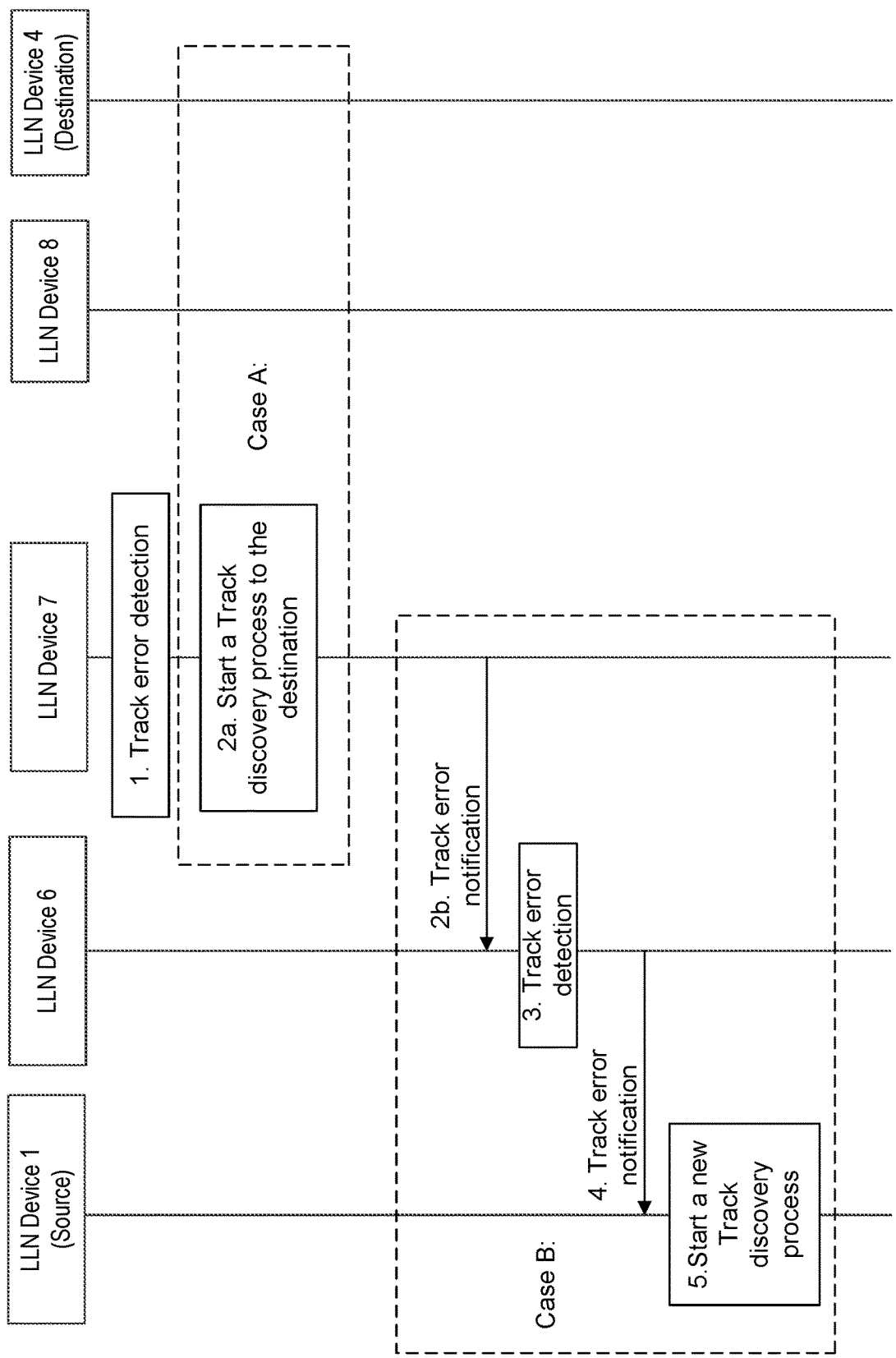
FIG. 17 is set of call flows for two example track error handling scenarios.
Figure 18:
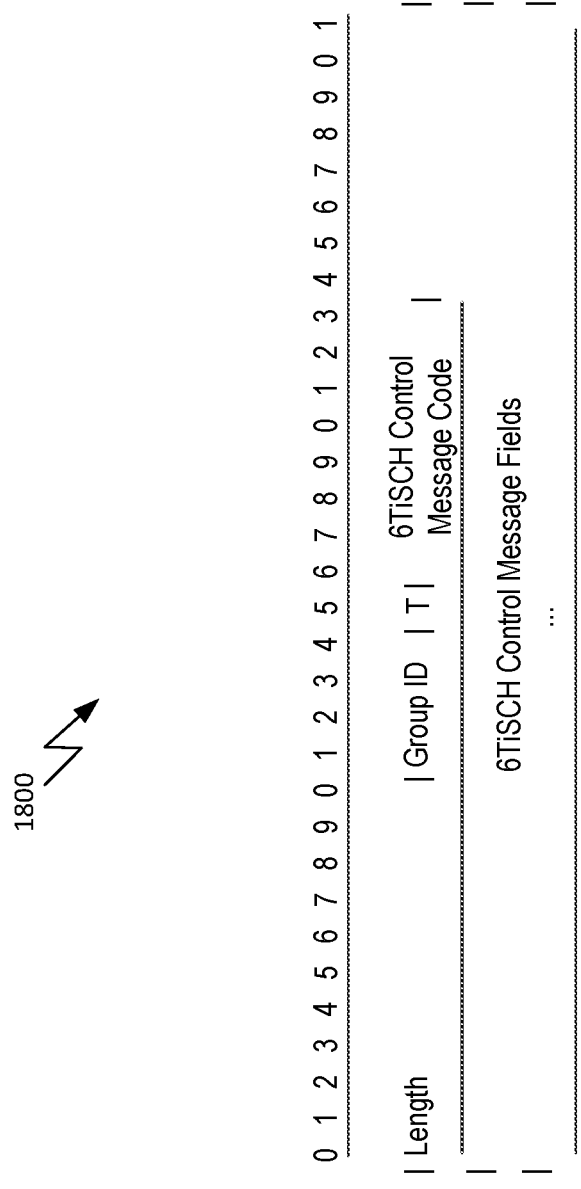
FIG. 18 is a data layout of an IEEE 802.15.4 information element (IE) implementing a 6TiSCH control message.

FIG. 17 shows example call flows 1700, including Case A and Case B, for error handling. Here again, source LLN device 1 is connected to destination LLN device 4 via a track that includes hops to LLN devices 6, 7, and 8.

In step 1, LLN device 7 detects the track error. In response, LLN device 7 releases the resource associated with the next hop LLN device on the track, LLN device 8. LLN device 7 may further act in at least two ways. In Case A, LLN device 7 may initiate a track discovery and reservation method in step 2A. This is achieved by methods similar to those described above, beginning with sending a new track discovery request to the destination LLN device 4 via the neighbors of LLN device 7. Note, however, that in Case A, the source LLN device 1 may not necessarily be aware of the changes to the track.

Alternatively, in Case B, if LLN device 7 does not intend to start the new track discovery and reservation method due to a limited resource such as low power energy or the track discovery and reservation method fails to discover a new track to the destination, LLN device 7 sends a track error notification message 2B to the previous hop device, LLN device 6. Track error notification message 2B may be of the form shown in Table 14.

In step 3, LLN device 6 detects the track error via receipt of the track error notification message 2B. Similar to LLN device 7 in step 1, LLN device 6 may initiate another track discovery and reservation method to discover a new track to the destination or send a track error notification message to its previous hop LLN device, source device 1.

In the example of FIG. 17, LLN device 6 opts to send a track error notification message 4 to its previous hop LLN device, LLN source device 1. LLN device 6 then releases the resource it held reserved for the track.

In step 5, source LLN device 1 will detect the track error via the track error notification message 4. Source LLN device 1 then initiates a new track discovery and reservation method.

6TiSCH control message may be carried by ICMPv6 messages. This is achieved using an ICMPv6 message with an ICMPv6 header followed by a message body as shown in Table 3 above. For example, a 6TiSCH control message may be carried by an ICMPv6 information message with a type header field value of 159. The code header field may be used to identify the type of 6TiSCH control carried in the message payload. Example values of the code field are shown in Table 15. The fields of each 6TiSCH control message is contained in the in the ICMPv6 message payload.

TABLE 15

Code Field for Different Types of 6TiSCH Control Messages

| Code | Message |
| --- | --- |
| 0x01 | Track Discovery Request Message |
| 0x02 | Track Selection Reply Message |
| 0x03 | Track Reservation Failure Message |
| 0x04 | Track Keep-alive Message |
| 0x05 | Track Resource Update Request Message |
| 0x06 | Track Resource Update Reply Message |
| 0x07 | Track Error notification Message |

If the destination of the message is one hop away from the sender, a 6TiSCH control messages may also be carried by 802.15.4e via payload Information Elements (IEs). An example format of a 6TiSCH Control IE is shown in FIG. 15. Example fields in a 6TiSCH Control IE are described in Table 16.

TABLE 16

Fields in 6TiSCH Control IE

| Fields name | Description |
| --- | --- |
| Length | The length of the IE |
| Group ID | The Group ID can be set as an unreserved value between 0x2-0x9, e.g. 0x2. |
| T | Set to 1 to indicate this is a long format packet |
| 6TiSCH Control Message Code | This field indicates the type of the 6TiSCH control messages. The message code and type mapping can be the same as in Table 15. |
| 6TiSCH Control Message Fields | The fields of each 6TiSCH control messages as shown in Table 6, Table 7, Table 9 and Table 10. |

6TiSCH control messages may also be transmitted, for example, using IETF CoAP. Each control message may be associated with a URI path, as shown in Table 17. These URI paths may be maintained by the BR and/or LLN devices. To send a control message to a destination, the sender needs to issue a RESTful method, e.g., POST method, to the destination, with the address set to the corresponding URI path. The destination may maintain the corresponding URI path.

TABLE 17

Mapping 6TiSCH Control Message to CoAP Resources

| 6TiSCH Control Message | CoAP Resource | URI path |
| --- | --- | --- |
| Track Discovery Request Message | Discovery Request | /PathRequest |
| Track Selection Reply Message | Selection Reply | /PathReply |
| Track Reservation Failure Message | Track Reservation Failure | /TrackRsrvFail |
| Track Keep-alive Message | Keep-alive | /KeepAlive |
| Track Resource Update Request Message | Resource Update Request | /UpdateReq |
| Track Resource Update Reply Message | Resource Update Reply | /UpdateRep |
| Track Error notification Message | Track Error notification | /TrackError |

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 19:
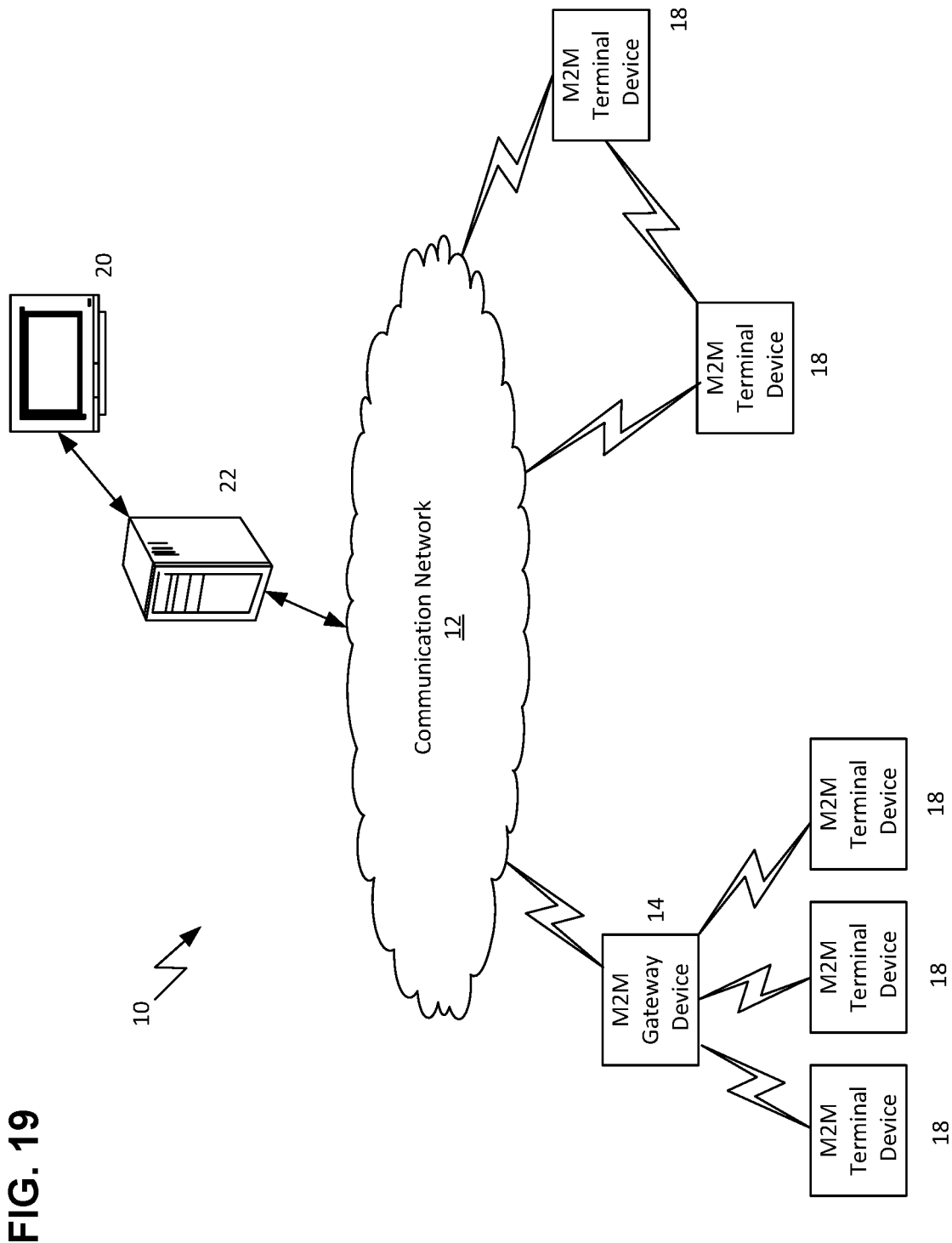
FIG. 19 is a system diagram of an example machine-to-machine (M2M), Internet of Things (IoT), or Web of Things (WoT) communication system in which one or more disclosed embodiments may be implemented.

As shown in FIG. 19, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 20:
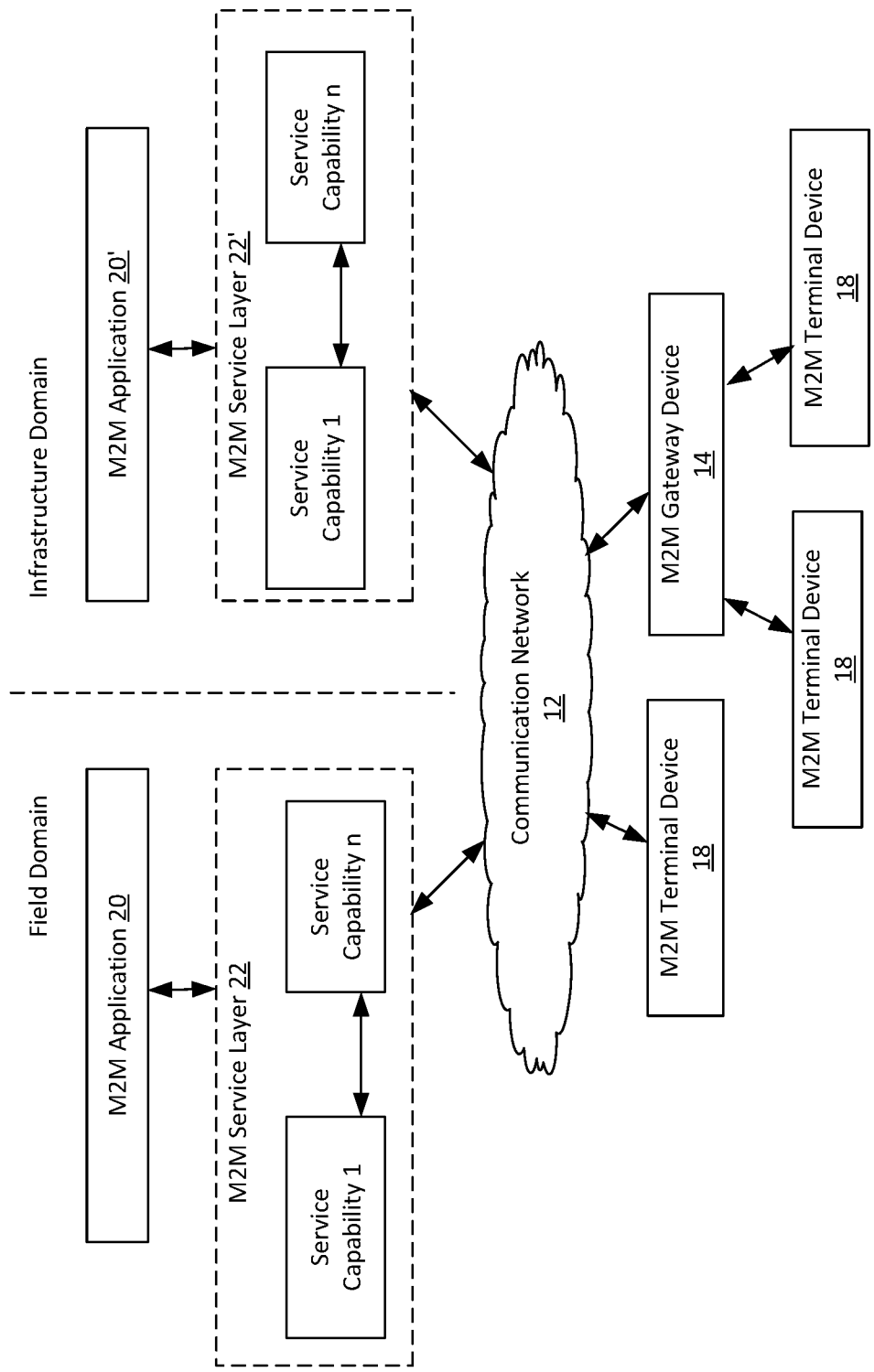
FIG. 20 is a system diagram of an example architecture that may be used within the M2M/IoT/WoT communications system illustrated in FIG. 19.

Referring to FIG. 20, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 20, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 19 and 20, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21 or FIG. 22 described below.

For example, the term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Further, the methods and functionalities described herein may be implemented as part of an M2M network that uses a Service Oriented Architecture (SOA) and/or a Resource-Oriented Architecture (ROA) to access services.

Figure 21:
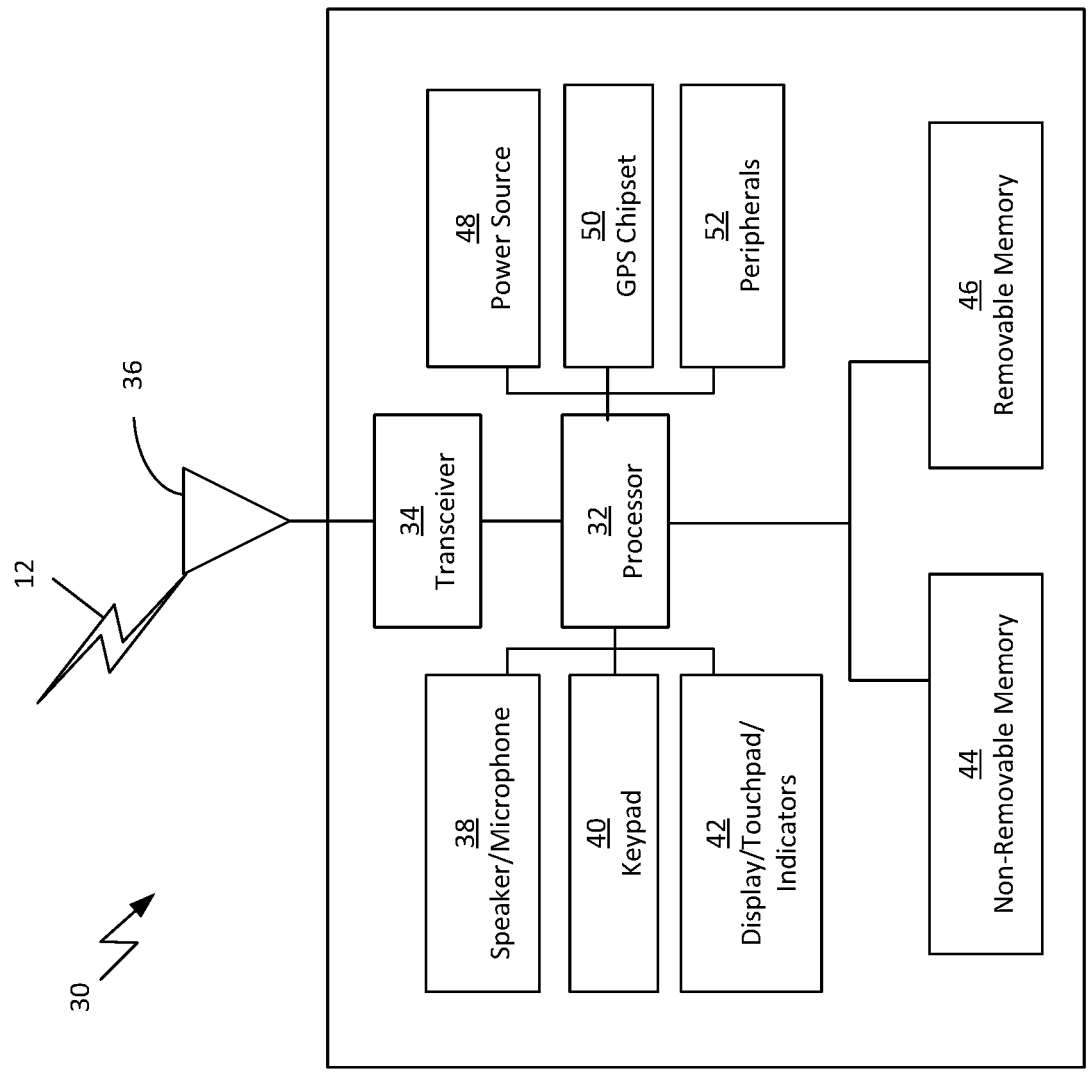
FIG. 21 is a system diagram of an example communication network node, such as an M2M/IoT/WoT device, gateway, or server that may be used within the communications system illustrated in FIGS. 19 and 20.

FIG. 21 is a block diagram of an example hardware/software architecture of a node of a network, such as one of the devices illustrated in FIG. 2, or 4-17 which may operate as an M2M server, gateway, device, or other node in an M2M network such as that illustrated in FIGS. 19 and 20. As shown in FIG. 21, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements aspects of the track discovery, reservation, and maintenance functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 5, 7-9, and 11-17) and in the claims. While FIG. 21 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 22:
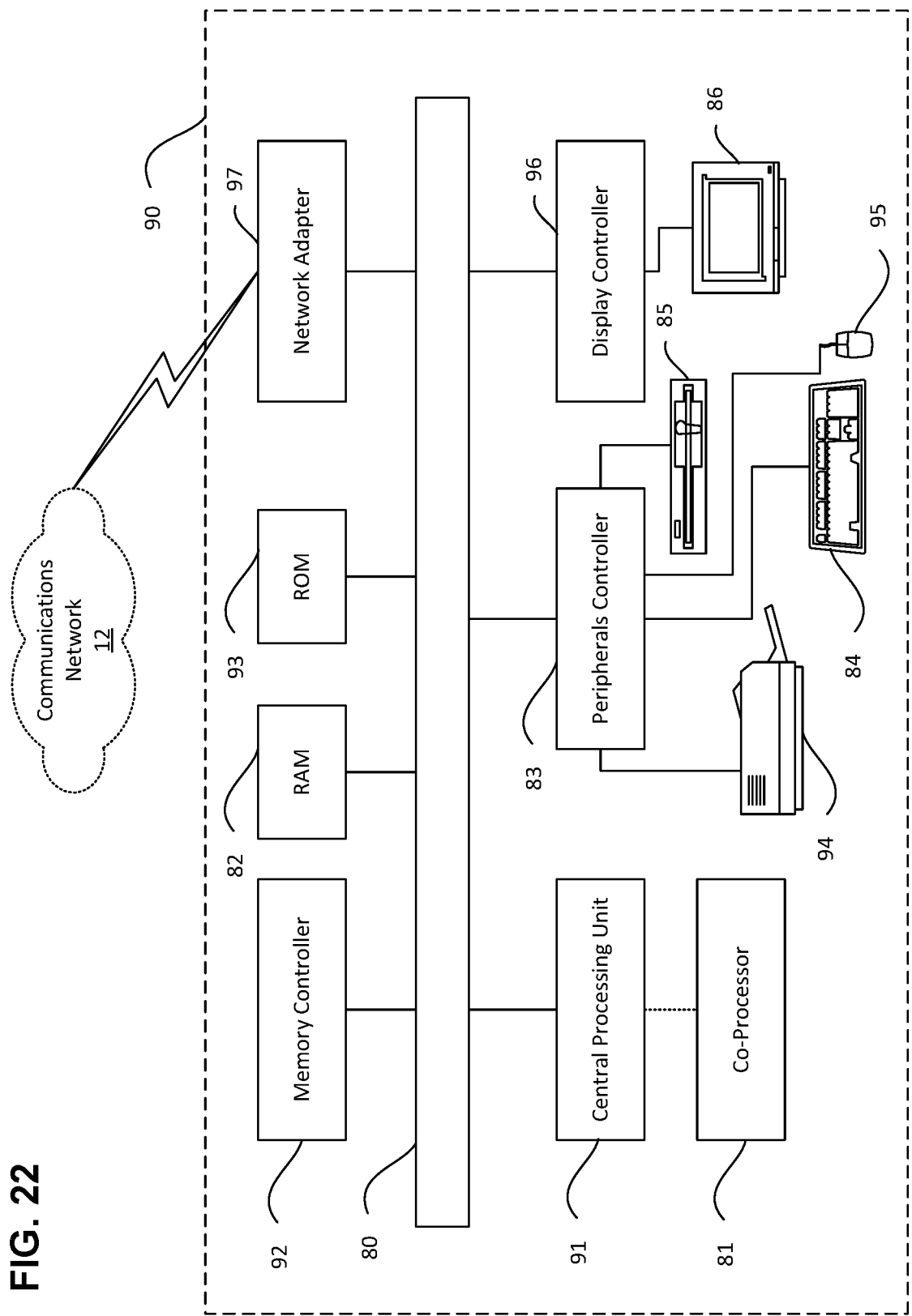
FIG. 22 is a block diagram of an example computing system in which a node of the communication system of FIGS. 19 and 20 may be embodied.

FIG. 22 is a block diagram of an exemplary computing system 90 which may also be used to implement one or more nodes of a network, such as the devices illustrated in FIG. 2, or 4-17, which may operate as an M2M server, gateway, device, or other node in an M2M network such as that illustrated in FIGS. 19 and 20. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as track discovery, reservation, and maintenance.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 19 and FIG. 20, to enable the computing system 90 to communicate with other nodes of the network. The communication circuitry, alone or in combination with the CPU 91, may be used to perform the transmitting and receiving steps described herein (e.g., in FIGS. 5, 7-9, and 11-17) and in the claims.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

Figure 23:
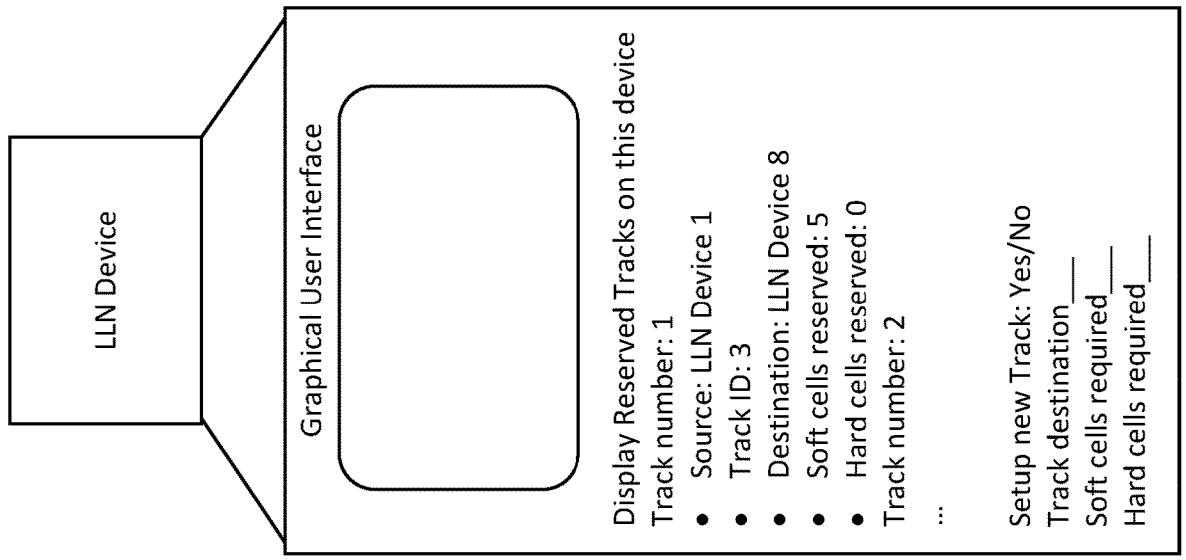
FIG. 23 shows an example graphical user interface (GUI) that may be operated on an LLD device.

FIG. 23 shows an example graphical user interface (GUI) that may be operated on an LLD device. Such a GUI may be used, for example, to monitor and display tracks that are reserved on the device, including the source, the destination, ID, soft cells and hard cells reserved for the each track. The GUI may further be used, for example, to trigger the setup of a new track originated from the device using input from the user of the GUI as to the destination of the track, soft cells, and hard requests for the track.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus comprising a processor, a memory, and communication circuitry, the apparatus being a first network device connected, via the communication circuitry, to a second network device and a third network device on a network, the network using Internet Protocol over a time slotted channel hopping mode of an IEEE 802.15.4 (6TiSCH) protocol, the apparatus further comprising computer-executable instructions stored in the memory which, when executed by the processor, cause the apparatus to:
receive a first track discovery request from the second network device, the first discovery track request comprising an identifier of an intended ultimate recipient of a track, an indication of desired Time Slotted Channel Hopping (TSCH) parameters for the track, and a first candidate route for the track comprising a first list comprising an indicia of each network device that the first track discovery request has traversed, the first candidate route signifying that each network device in the first list has sufficient soft cells to meet the desired TSCH parameters for the track;
determine whether the apparatus is the intended ultimate recipient of the request;
if the apparatus is the intended ultimate recipient, then reserve the first candidate route as the track by sending a first track selection reply to the second network device;
if the apparatus is not the intended ultimate recipient and the apparatus has sufficient soft cells available to meet the TSCH parameters for the track, send to the third network device a second track discovery request comprising the indication of desired TSCH parameters for the track and a second candidate route, the second candidate route comprising the first list and an indicia of the apparatus, the second candidate route signifying that each network device indicated in the first list and the apparatus have soft cells available to meet the TSCH parameters for the track;
receive a second track selection reply from the third network device, the second track selection reply pertaining to the second track discovery request and, if the apparatus still has sufficient soft cells available to meet the TSCH parameters for the track, reserve one or more soft cells of the apparatus for the track and send, to the second network device, a third track selection reply.

2. The apparatus of claim 1, wherein the computer-executable instructions cause the apparatus to further:
receive a third track discovery request, the third track discovery request comprising the identifier of the intended ultimate recipient of the track, the indication of desired TSCH parameters for the track, and a second candidate route for the track comprising a second list comprising indicia of network devices that the third track discovery request has traversed, the second candidate route signifying that each network device in the second list has sufficient soft cells to meet the desired TSCH parameters for the track; and wherein
the second track discovery request is not sent if the first track discovery request traversed a longer path than the third discovery request.

3. The apparatus of claim 1, wherein the second track discovery request is sent to all neighbors of the apparatus.

4. The apparatus of claim 1, wherein the computer-executable instructions cause the apparatus to further, if after the first track selection reply is sent to the second network device or the second track discovery request is sent to the third network device, expected communications are not received before a timeout period has elapsed, release the first candidate route.

5. The apparatus of claim 1, wherein the computer-executable instructions cause the apparatus to further send a track selection failure message to the third network device if the reserved first set of communications resources is not available.

6. The apparatus of claim 1, wherein the computer-executable instructions cause the apparatus to further, after the third track selection reply is sent to the second network device:
receive a track update request from the second network device,
evaluate whether the track update request can be accommodated with available resources, and
if the track update request can be accommodated, select and reserve a second set of communications resources based on the track update request and forward the track update request to the third network device.

7. The apparatus of claim 1, wherein the apparatus is further configured to:
after the third track selection reply is sent to the second network device, detect a track error; and
send a third track discovery request to the network neighbors of the apparatus.

8. The apparatus of claim 1, wherein the computer-executable instructions cause the apparatus to further:
after the third track selection reply is sent to the second network device, detect a track error; and
send a track error message to the second network device.

9. The apparatus of claim 1, wherein the apparatus is a Constrained Application Protocol (CoAP) compliant device.

10. The apparatus of claim 1, wherein the computer-executable instructions cause the apparatus to not send the second track discovery request if a maximum number of forwards has been reached.

11. A method performed by a first network device, the first network device being connected to a second network device and a third network device on a network, the network using Internet Protocol over a time slotted channel hopping mode of an IEEE 802.15.4 (6TiSCH) protocol, the method comprising:
receiving a first track discovery request from the second network device, the first discovery track request comprising an identifier of an intended ultimate recipient of a track, an indication of desired Time Slotted Channel Hopping (TSCH) parameters for the track, and a first candidate route for the track comprising a first list comprising an indicia of each network device that the first track discovery request has traversed, the first candidate route signifying that each network device in the first list has sufficient soft cells to meet the desired TSCH parameters for the track;
determining whether the first network device is the intended ultimate recipient of the request;
if the first network device is the intended ultimate recipient, then reserving the first candidate route as the track by sending a first track selection reply to the second network device;
if the first network device is not the intended ultimate recipient and the first network device has sufficient soft cells available to meet the TSCH parameters for the track, send to the third network device a second track discovery request comprising the indication of desired TSCH parameters for the track and a second candidate route, the second candidate route comprising the first list and an indicia of the first network device, the second candidate route signifying that each network device indicated in the first list and the first network device have soft cells available to meet the TSCH parameters for the track;
receiving a second track selection reply from the third network device, the second track selection reply pertaining to the second track discovery request and, if the first network device still has sufficient soft cells available to meet the TSCH parameters for the track, reserving one or more soft cells of the first network device for the track and sending, to the second network device, a third track selection reply.

12. The method of claim 11, further comprising:
receiving a third track discovery request, the third track discovery request comprising the identifier of the intended destination ultimate recipient of the track, the indication of desired TSCH parameters for the track, and a second candidate route for the track comprising a second list comprising indicia of network devices that the third track discovery request has traversed, the second candidate route signifying that each network device in the second list has sufficient soft cells to meet the desired TSCH parameters for the track; wherein
the second track discovery request is not sent if the first track discovery request traversed a longer path than the third discovery request.

13. The method of claim 11, wherein the second track discovery request is sent to all neighbors of the first network device.

14. The method of claim 11, further comprising if, after the first track selection reply is sent to the second network device or the second track discovery request is sent to the third network device, expected communications are not received before a timeout period has elapsed, releasing the first candidate route.

15. The method of claim 11, further comprising if the reserved first set of communications resources is not available, sending a track selection failure message to the third network device.

16. The method of claim 11, further comprising, after the third track selection reply is sent to the second network device:
receiving a track update request from the second network device,
evaluating whether the track update request can be accommodated with available resources, and
if the track update request can be accommodated, selecting and reserving a second set of communications resources based on the track update request and forward the track update request to the third network device.

17. The method of claim 11, further comprising:
after the third track selection reply is sent to the second network device, detecting a track error; and
sending a third track discovery request to the network neighbors of the first network device.

18. The method of claim 11, further comprising:
after the third track selection reply is sent to the second network device, detecting a track error; and
sending a track error message to the second network device.

19. The method of claim 11, wherein the first network device is a Constrained Application Protocol (CoAP) compliant device.

20. The method of claim 11, wherein, the second track discovery request is not sent if the first track discovery request traversed a longer path than the third discovery request.

* * * * *